US010306656B2

(12) United States Patent
Zhu et al.

(10) Patent No.: US 10,306,656 B2
(45) Date of Patent: May 28, 2019

(54) RESOURCE MANAGEMENT METHOD AND APPARATUS

(71) Applicant: Samsung Electronics Co., Ltd, Gyeonggi-do (KR)

(72) Inventors: Dalin Zhu, Beijing (CN); Bin Yu, Beijing (CN); Pengfei Sun, Beijing (CN); Ming Lei, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 15/509,187

(22) PCT Filed: Sep. 1, 2015

(86) PCT No.: PCT/KR2015/009193
§ 371 (c)(1),
(2) Date: Mar. 6, 2017

(87) PCT Pub. No.: WO2016/036111
PCT Pub. Date: Mar. 10, 2016

(65) Prior Publication Data
US 2017/0280467 A1    Sep. 28, 2017

(30) Foreign Application Priority Data
Sep. 4, 2014  (CN) .......................... 2014 1 0448542

(51) Int. Cl.
*H04W 72/08* (2009.01)
*H04W 72/04* (2009.01)
*H04L 1/18* (2006.01)
*H04L 12/24* (2006.01)
(Continued)

(52) U.S. Cl.
CPC ......... *H04W 72/085* (2013.01); *H04L 1/1812* (2013.01); *H04L 41/0803* (2013.01);
(Continued)

(58) Field of Classification Search
CPC ............... H04W 72/085; H04W 24/10; H04W 28/0278; H04W 72/0426; H04W 88/02;
(Continued)

(56) References Cited

U.S. PATENT DOCUMENTS

| 8,880,089 | B2* | 11/2014 | Morimoto | H04W 28/16 455/450 |
| 2010/0039951 | A1* | 2/2010 | She | H04B 7/024 370/252 |
| 2015/0189531 | A1* | 7/2015 | Seo | H04J 11/005 370/252 |

FOREIGN PATENT DOCUMENTS

| WO | 2013056394 A1 | 4/2013 | |
| WO | WO-2017089898 A1 * | 6/2017 | ........... H04L 5/0051 |

OTHER PUBLICATIONS

ZTE, "Discussion on Definitions of Coverage Scenarios", 3GPP TSG-RAN WG1 #76bis, R1-141428, Shenzhen, China, Mar. 31-Apr. 4, 2014, 2 pages.

(Continued)

*Primary Examiner* — Ian N Moore
*Assistant Examiner* — Latresa A McCallum

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The base station determines a cell edge user, receives information of a cell edge user in an adjacent cell; according to the information of cell edge users in the cell and the adjacent cell, establishes a virtual cell including the cell edge users, transmits configuration information of the cell edge user in the cell and configuration information of the cell to base stations each of which a cell edge user in the virtual cell is located at, and receives configuration information of each cell edge user and configuration information of a cell where (Continued)

the each cell edge user is located from a base station where the each cell edge user is located, and configures uplink-downlink resources and a transmission mode for the virtual cell.

20 Claims, 20 Drawing Sheets

(51) Int. Cl.
  *H04W 24/10* (2009.01)
  *H04W 28/02* (2009.01)
  *H04W 88/02* (2009.01)
  *H04W 88/08* (2009.01)
(52) U.S. Cl.
  CPC ....... *H04W 24/10* (2013.01); *H04W 28/0278* (2013.01); *H04W 72/0426* (2013.01); *H04W 88/02* (2013.01); *H04W 88/08* (2013.01)
(58) Field of Classification Search
  CPC ... H04W 88/08; H04L 1/1812; H04L 41/0803
  See application file for complete search history.

(56) References Cited

OTHER PUBLICATIONS

Intel Corporation, "On D2D Resource Allocation Modes and In/Edge/Out of Coverage Definition", 3GPP TSG RAN WG1 Meeting #77, R1-142018, Seoul, Korea, May 19-23, 2014, 6 pages.
Huawei, et al., "Definition of Coverage Zones for D2D Communication", 3GPP TSG RAN WG1 Meeting #77, R1-142543, Seoul, Korea, May 19-23, 2014, 3 pages.
Alcatel-Lucent, et al., "Definition of In-Coverage, Out-of-Coverage, and Edge-of-Cell Coverage", 3GPP TSG RAN WG1 Meeting #77, R1-142058, Seoul, South Korea, May 19-23, 2014, 3 pages.
International Search Report dated Jan. 6, 2016 in connection with International Application No. PCT/KR2015/009193, 3 pages.
Written Opinion of the International Searching Authority dated Jan. 6, 2016 in connection with International Application No. PCT/KR2015/009193, 5 pages.

\* cited by examiner

[Fig. 1]
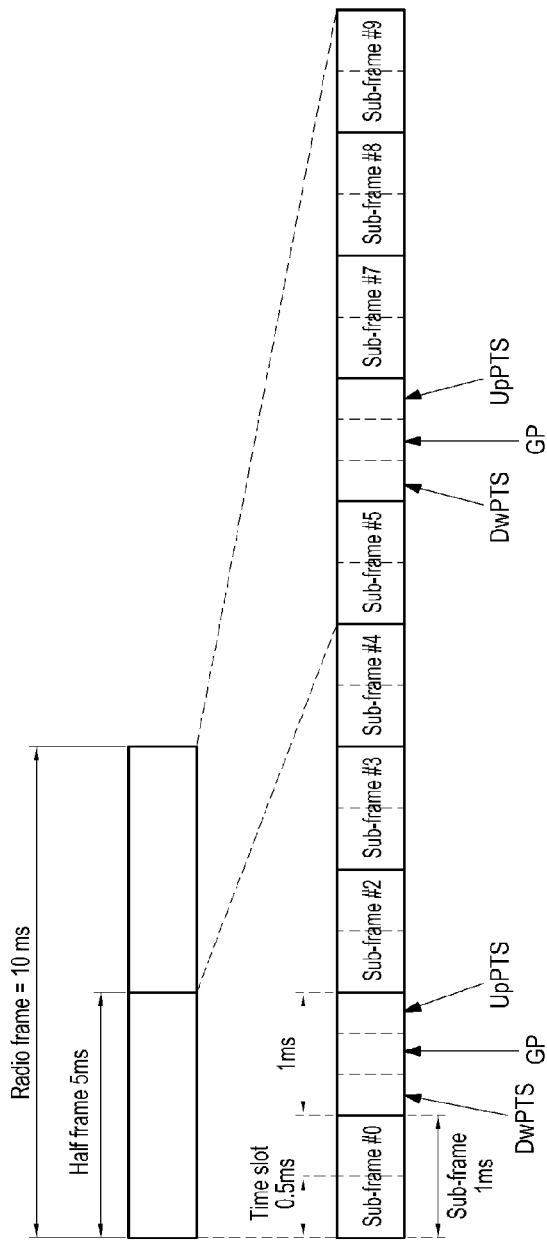
[Fig. 2a]
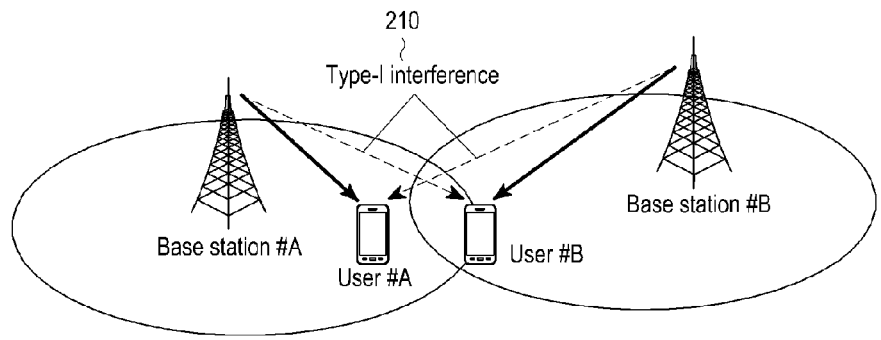

[Fig. 2b]
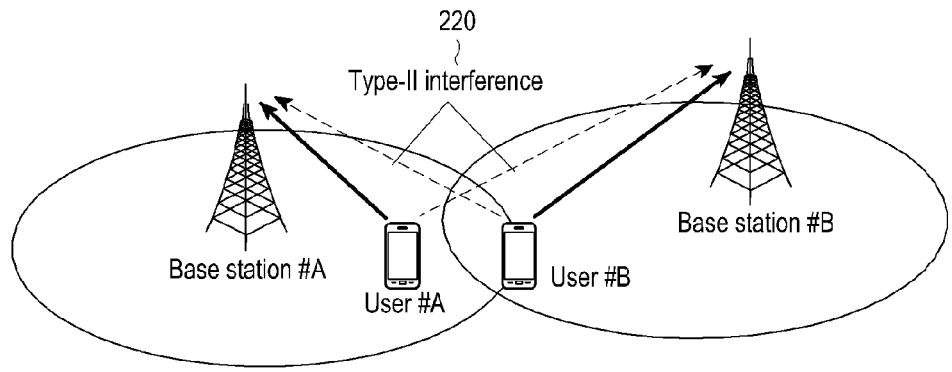
[Fig. 2c]
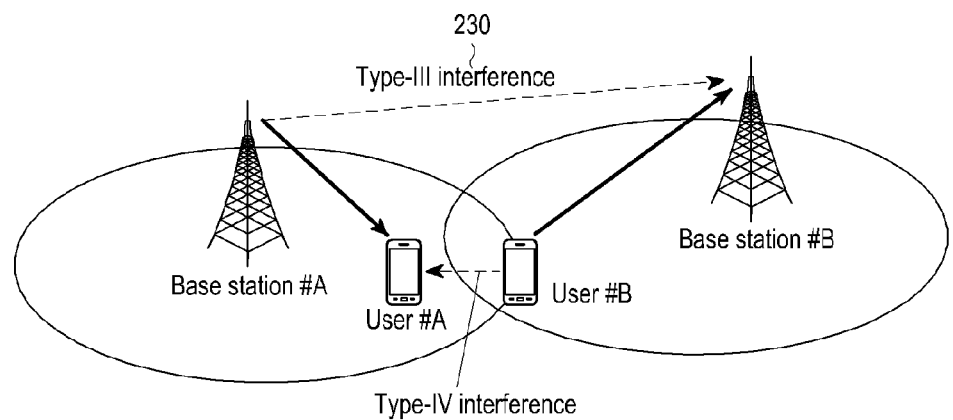
[Fig. 3]
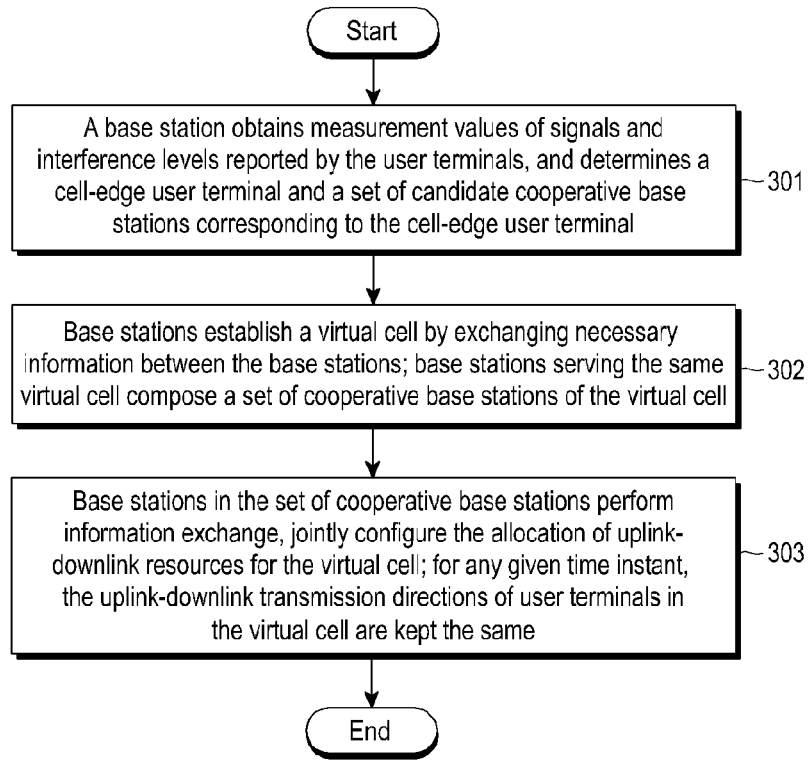

[Fig. 4]
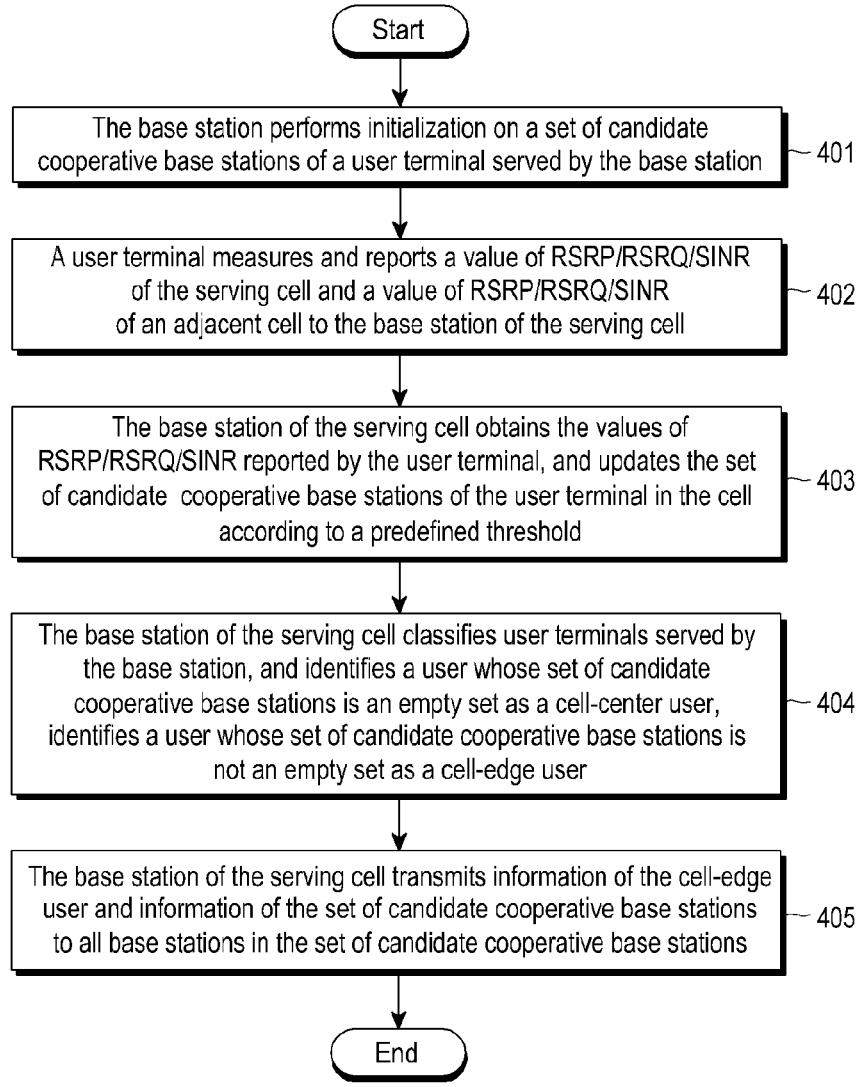
[Fig. 5]
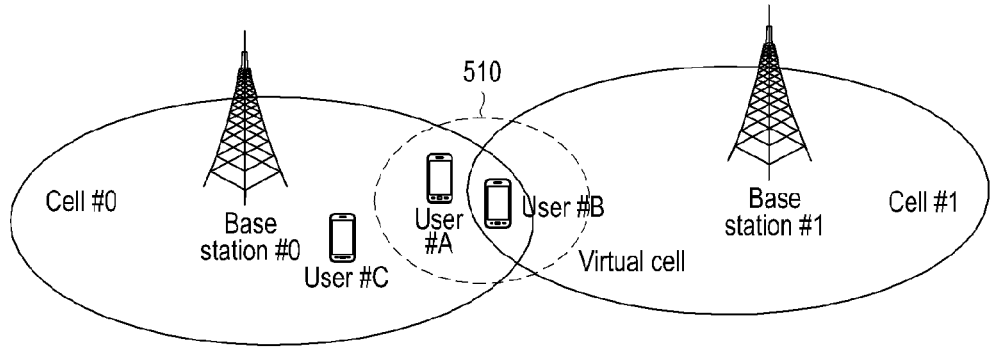

[Fig. 6]
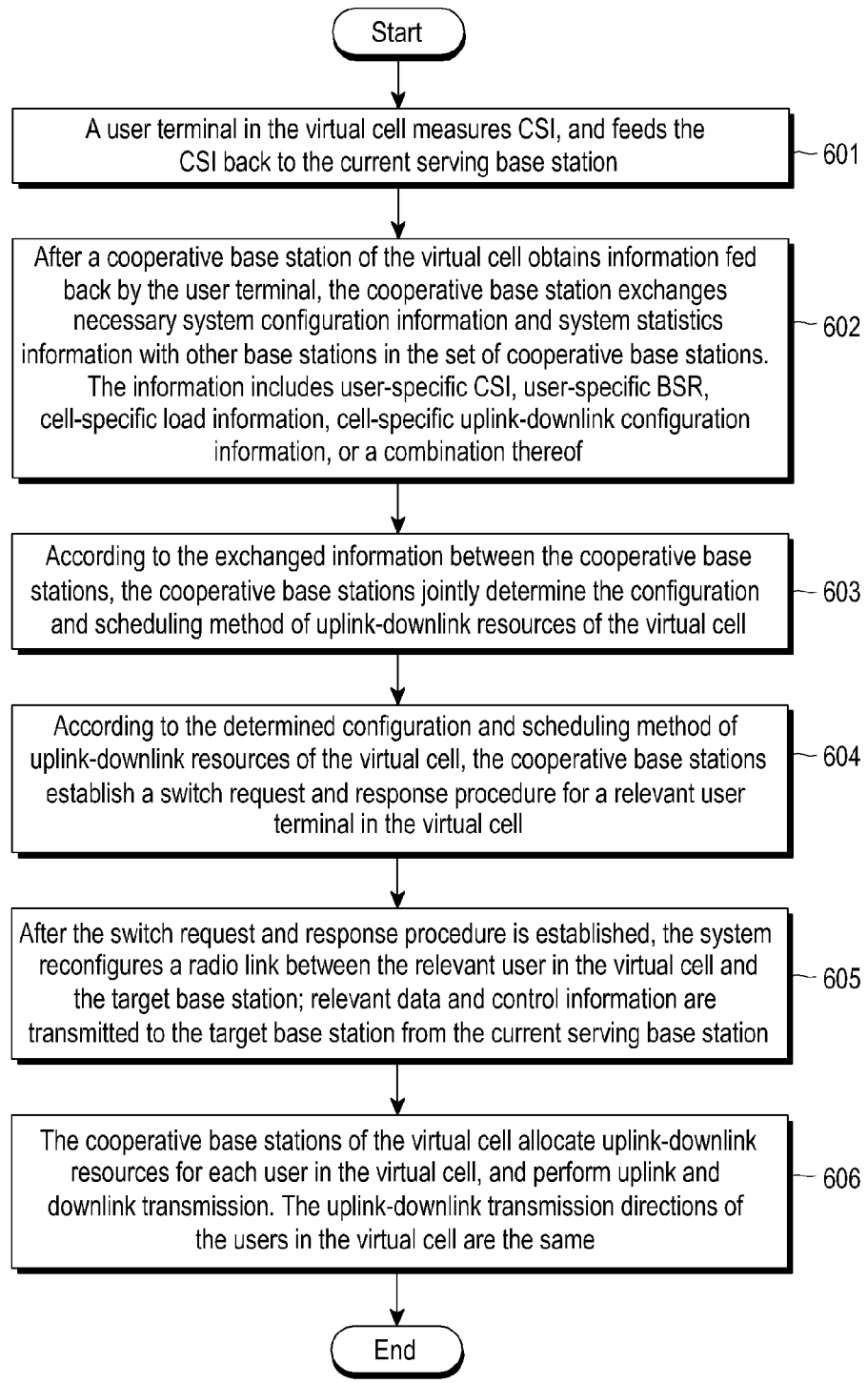

[Fig. 7]
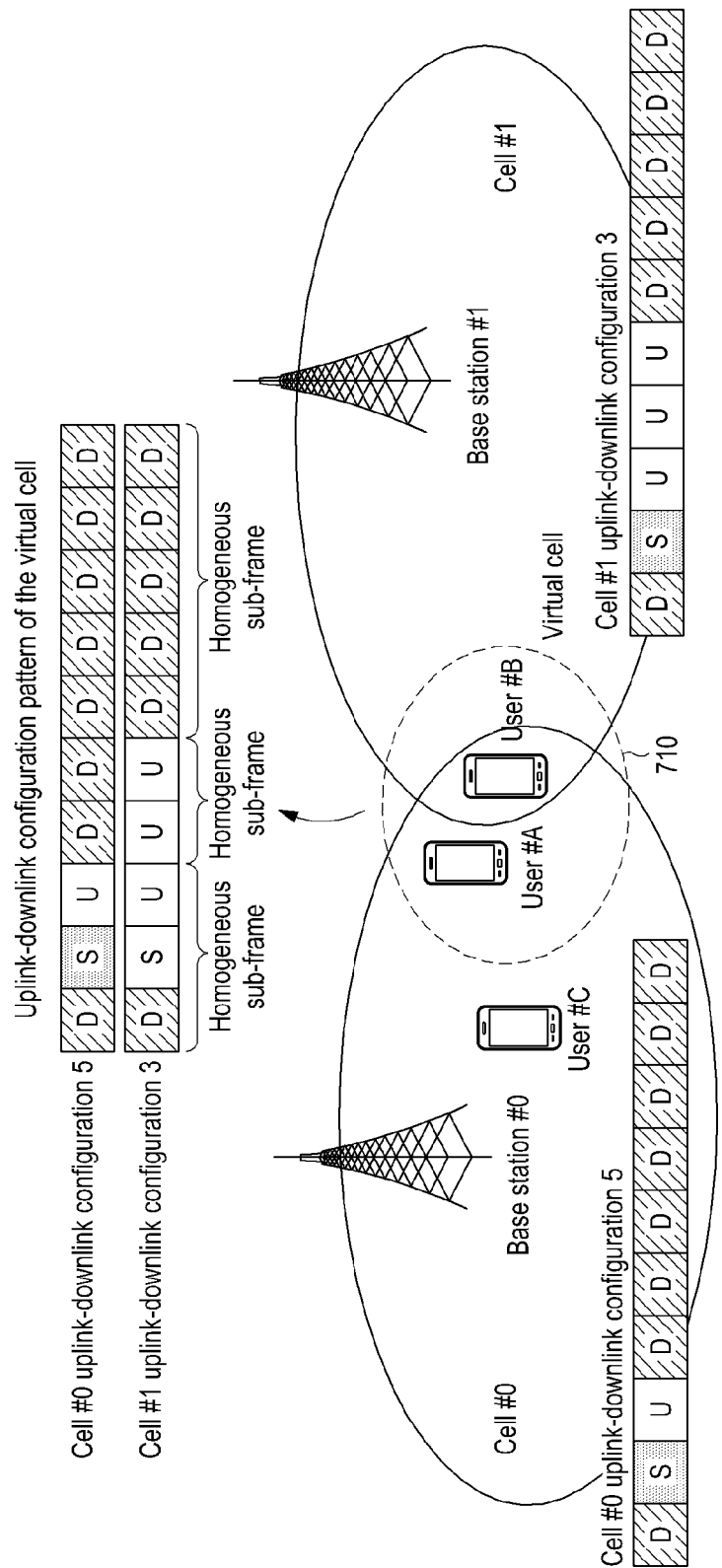

[Fig. 8a]
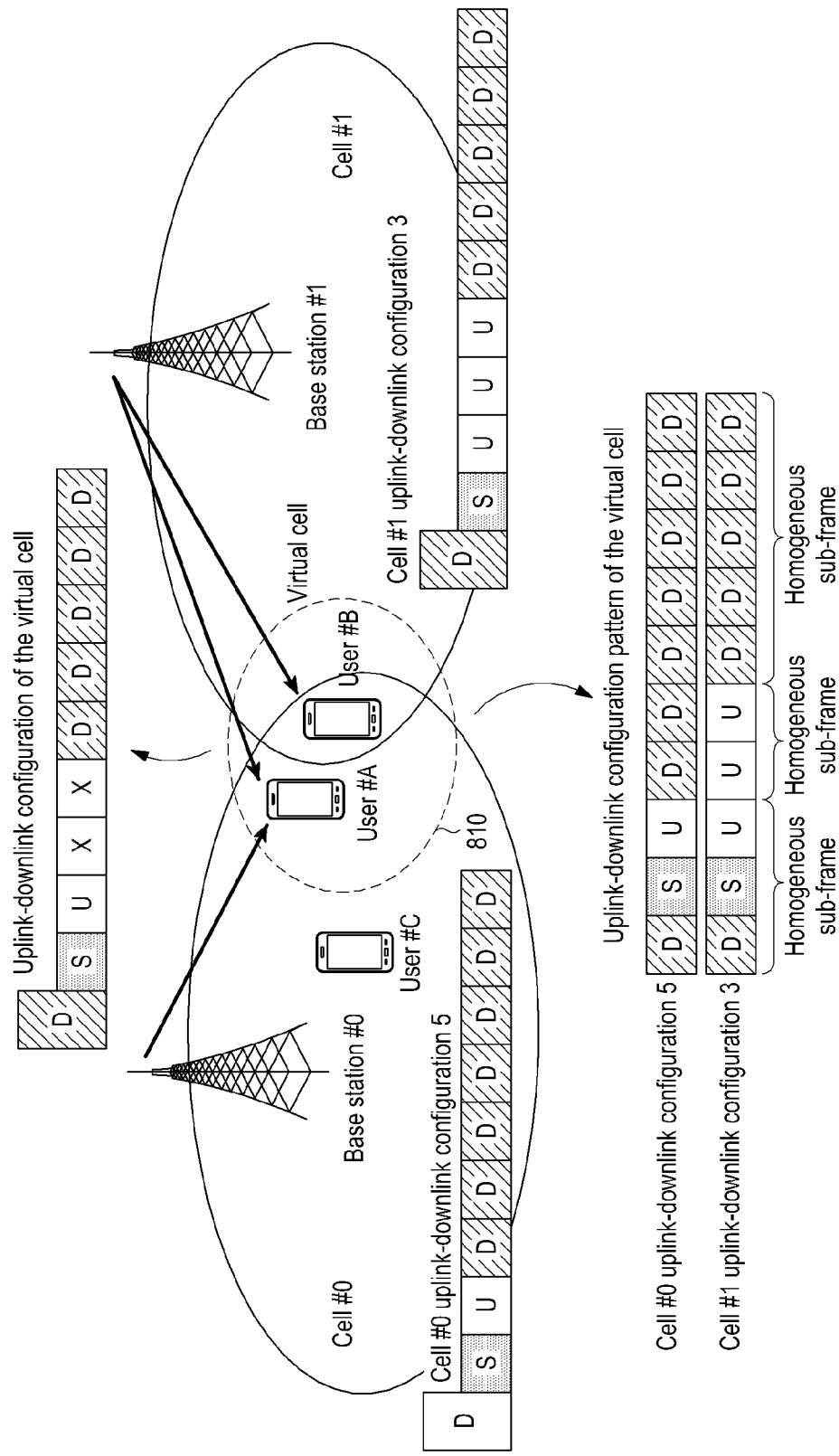

[Fig. 8b]
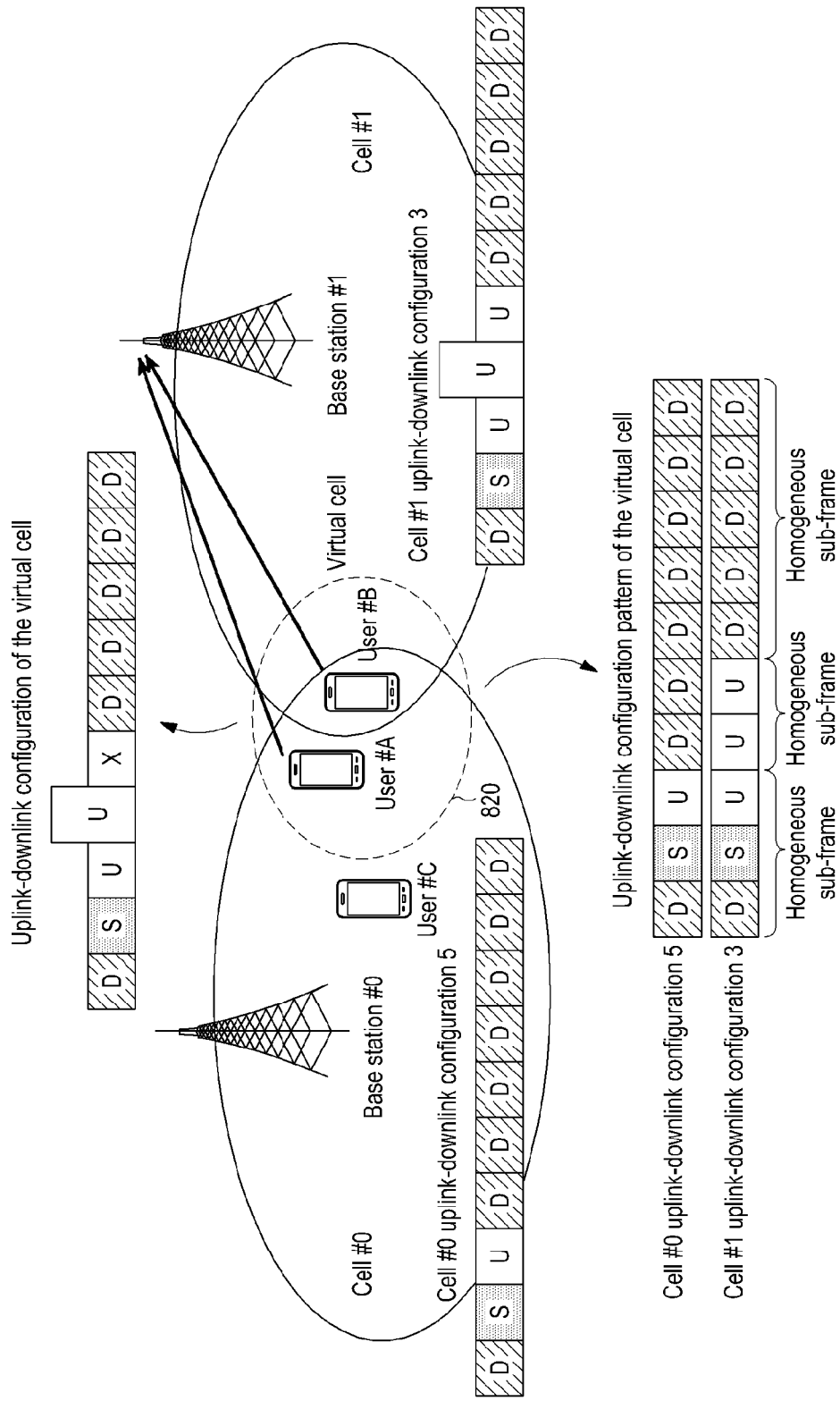

[Fig. 8c]
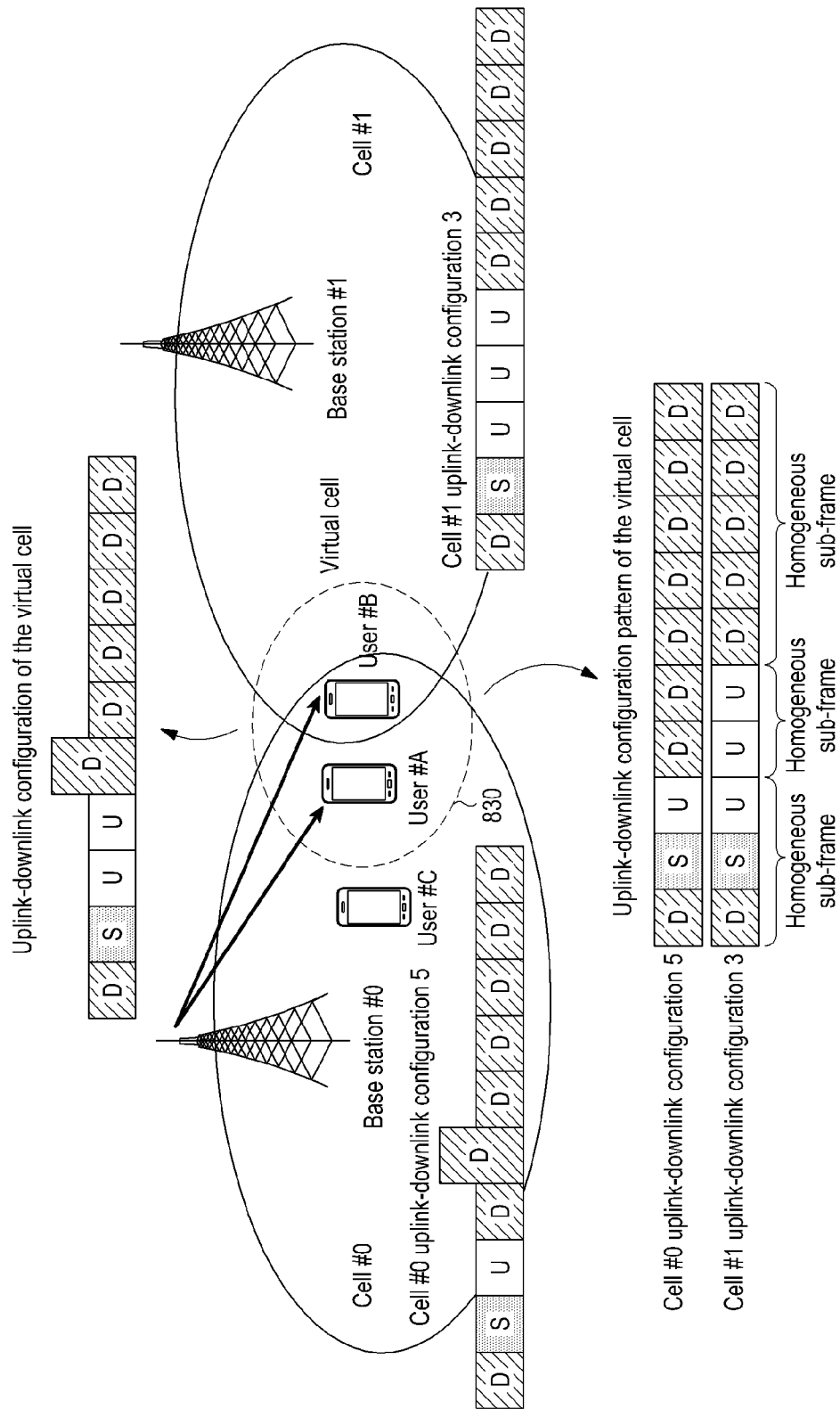

[Fig. 8d]
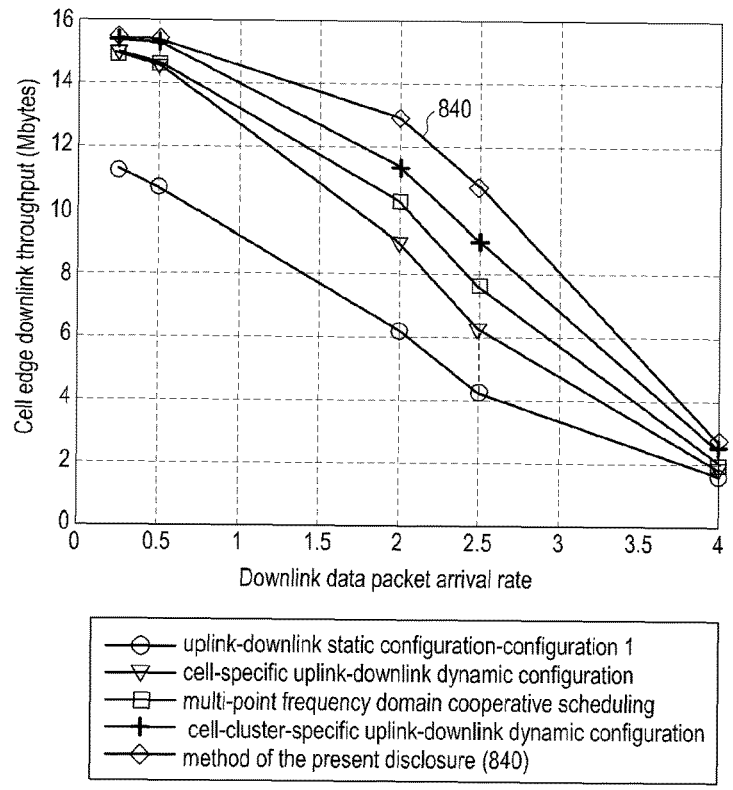
[Fig. 8e]
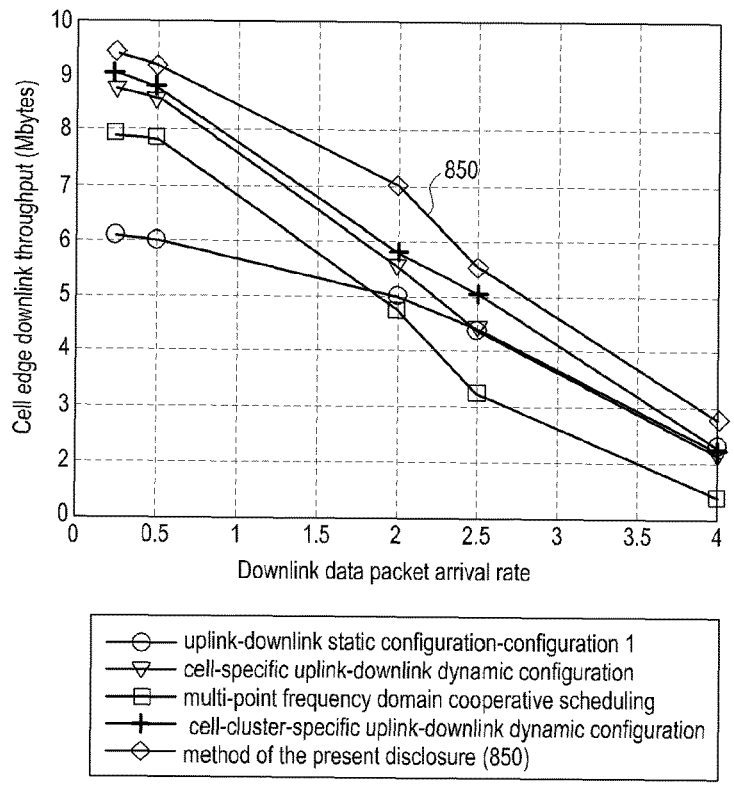

[Fig. 9]
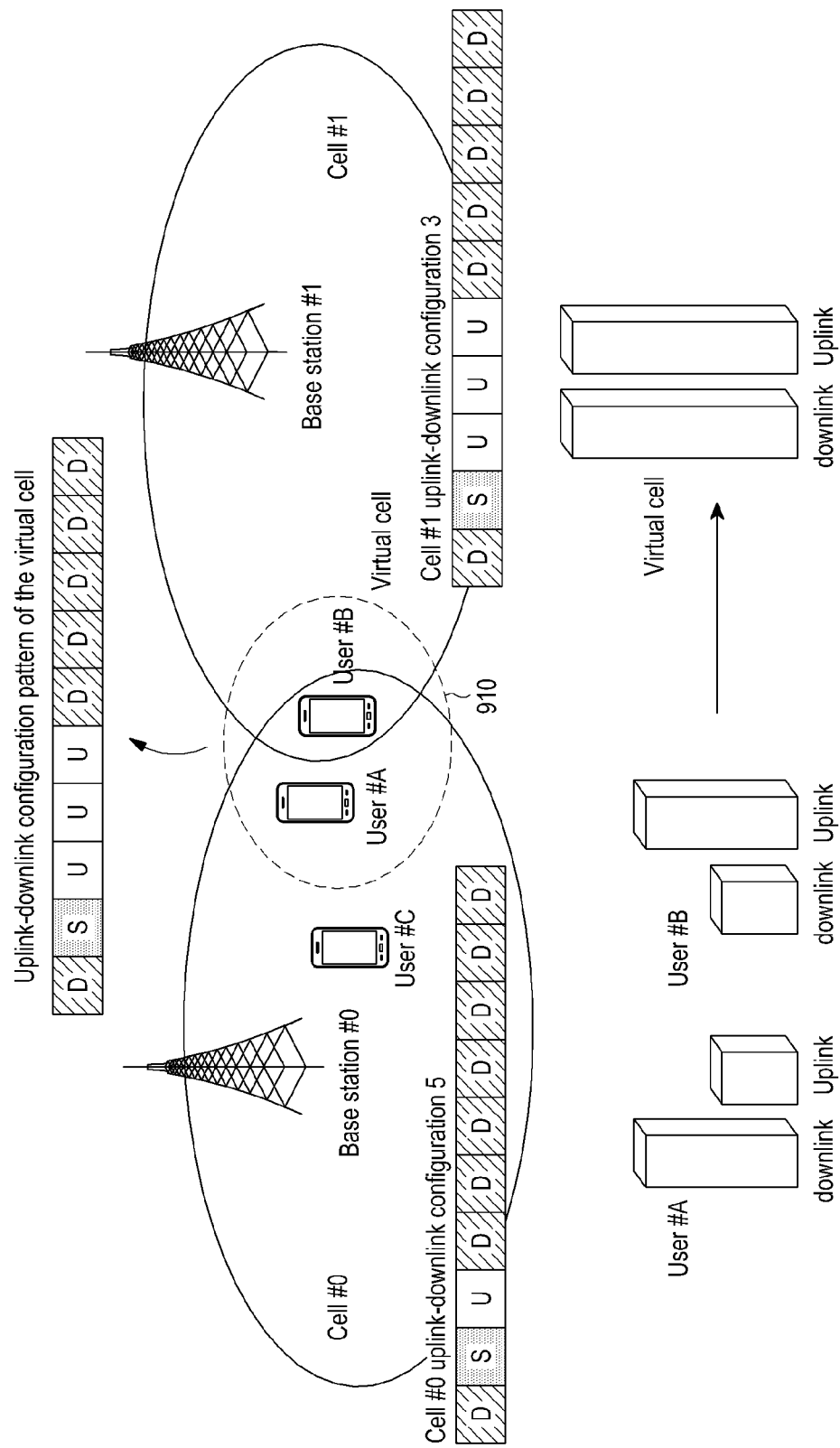

[Fig. 10]
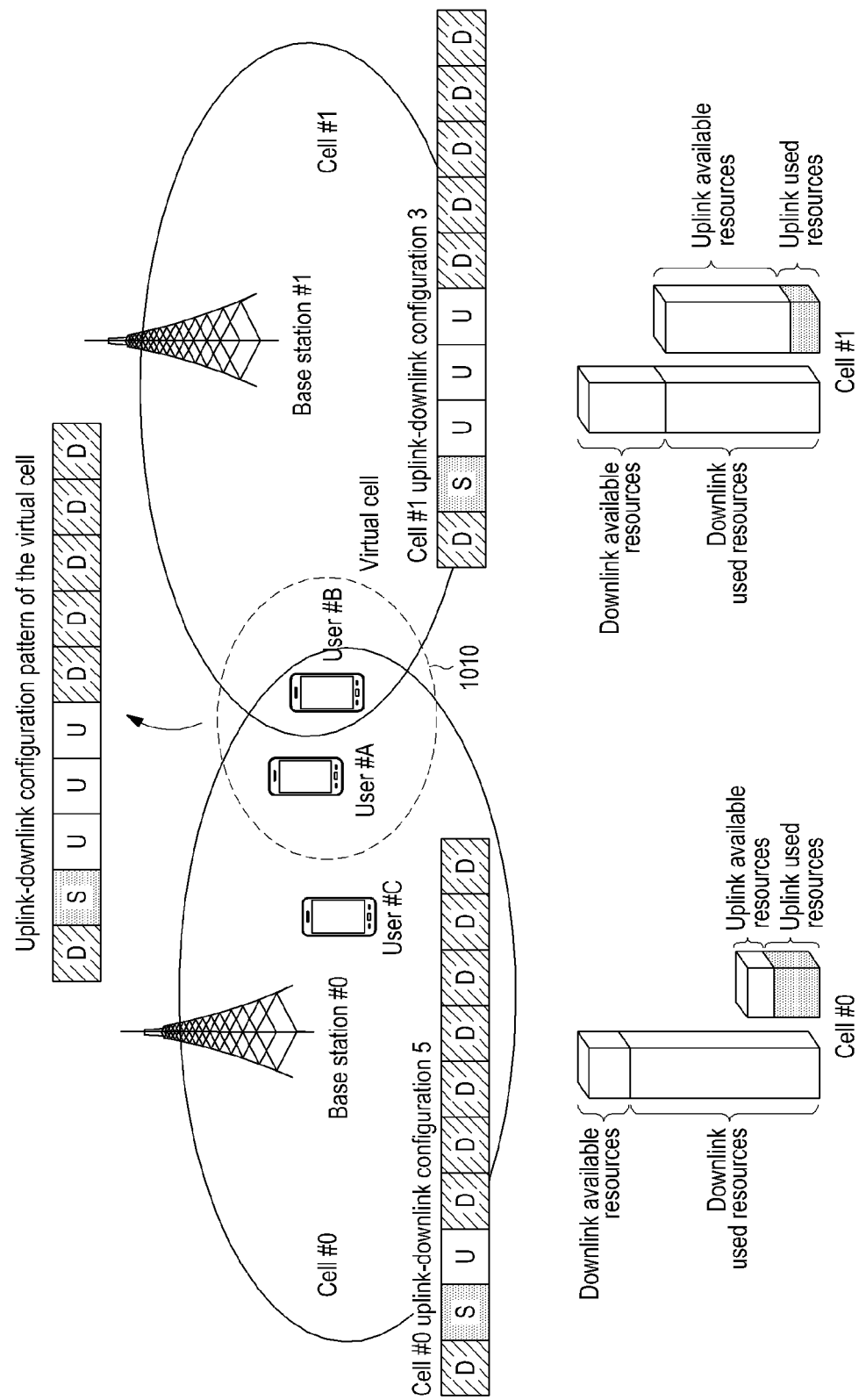

[Fig. 11a]
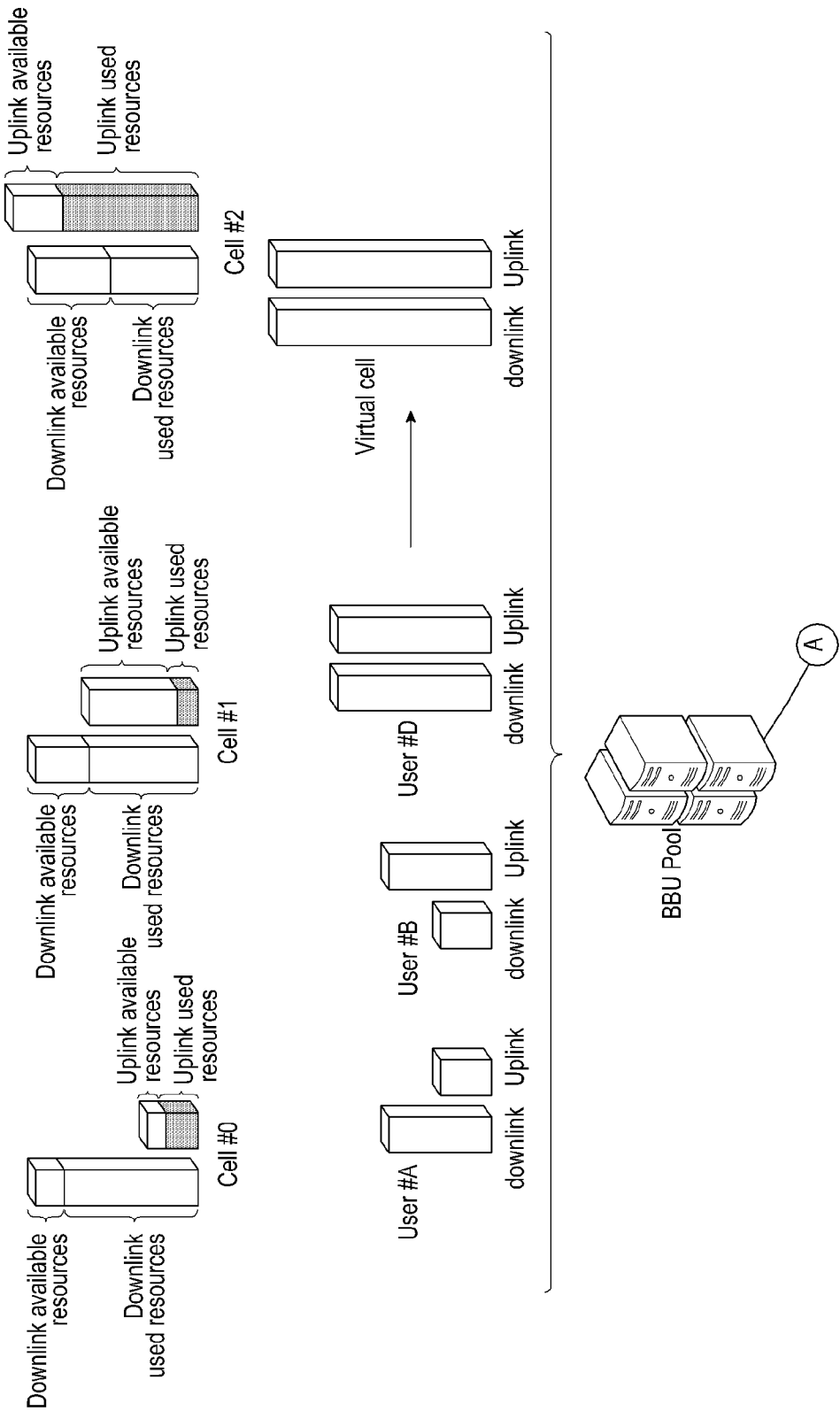

[Fig. 11b]
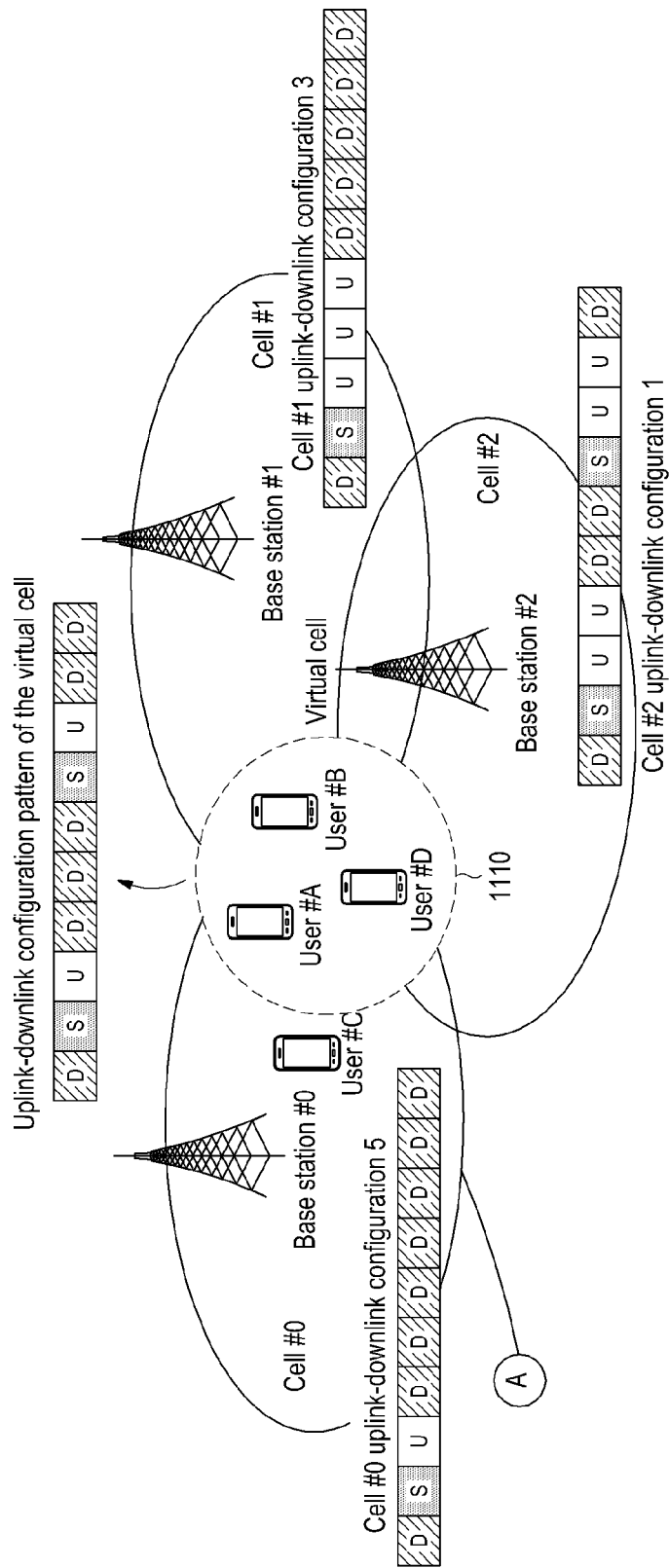

[Fig. 11c]
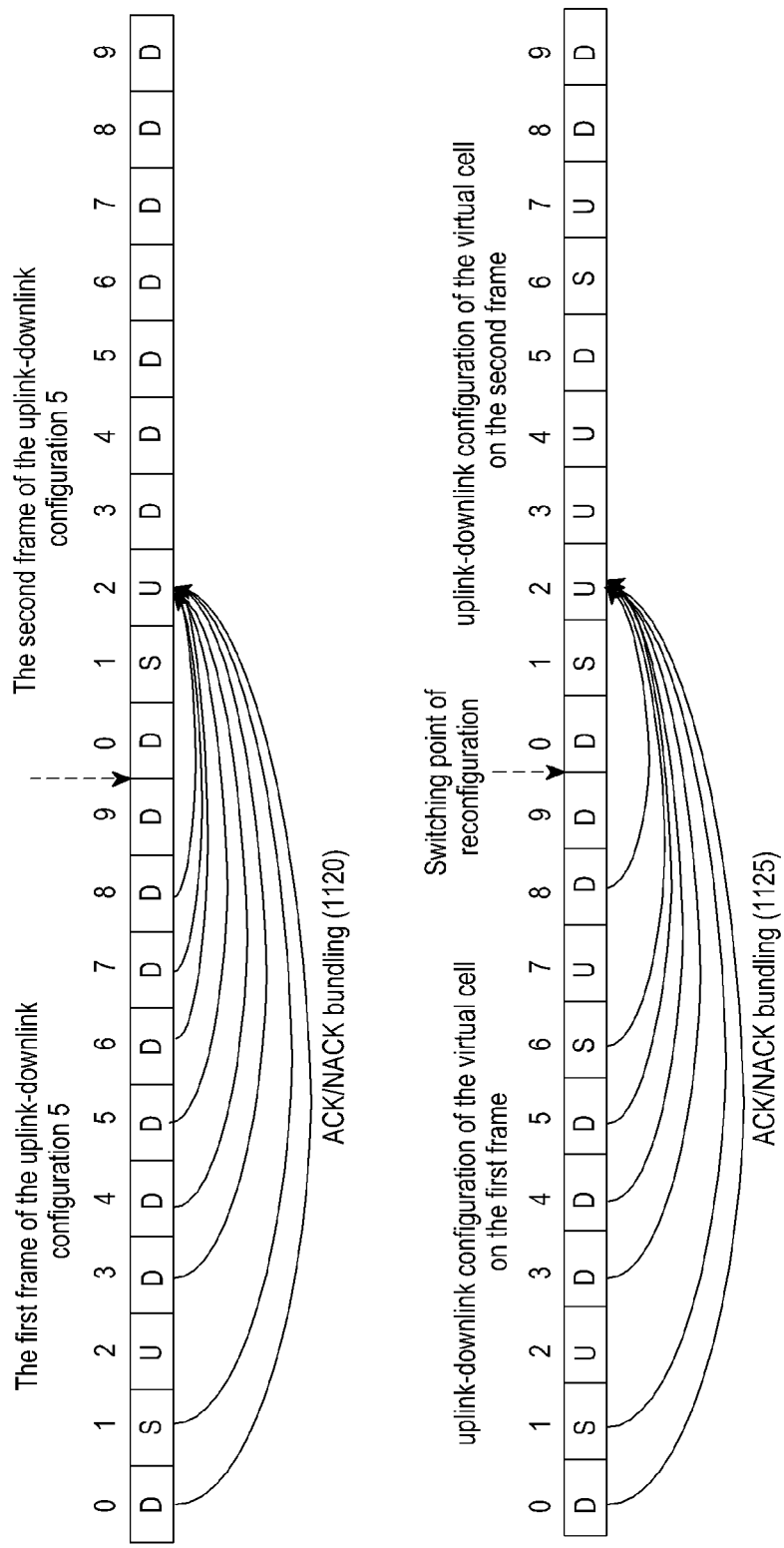

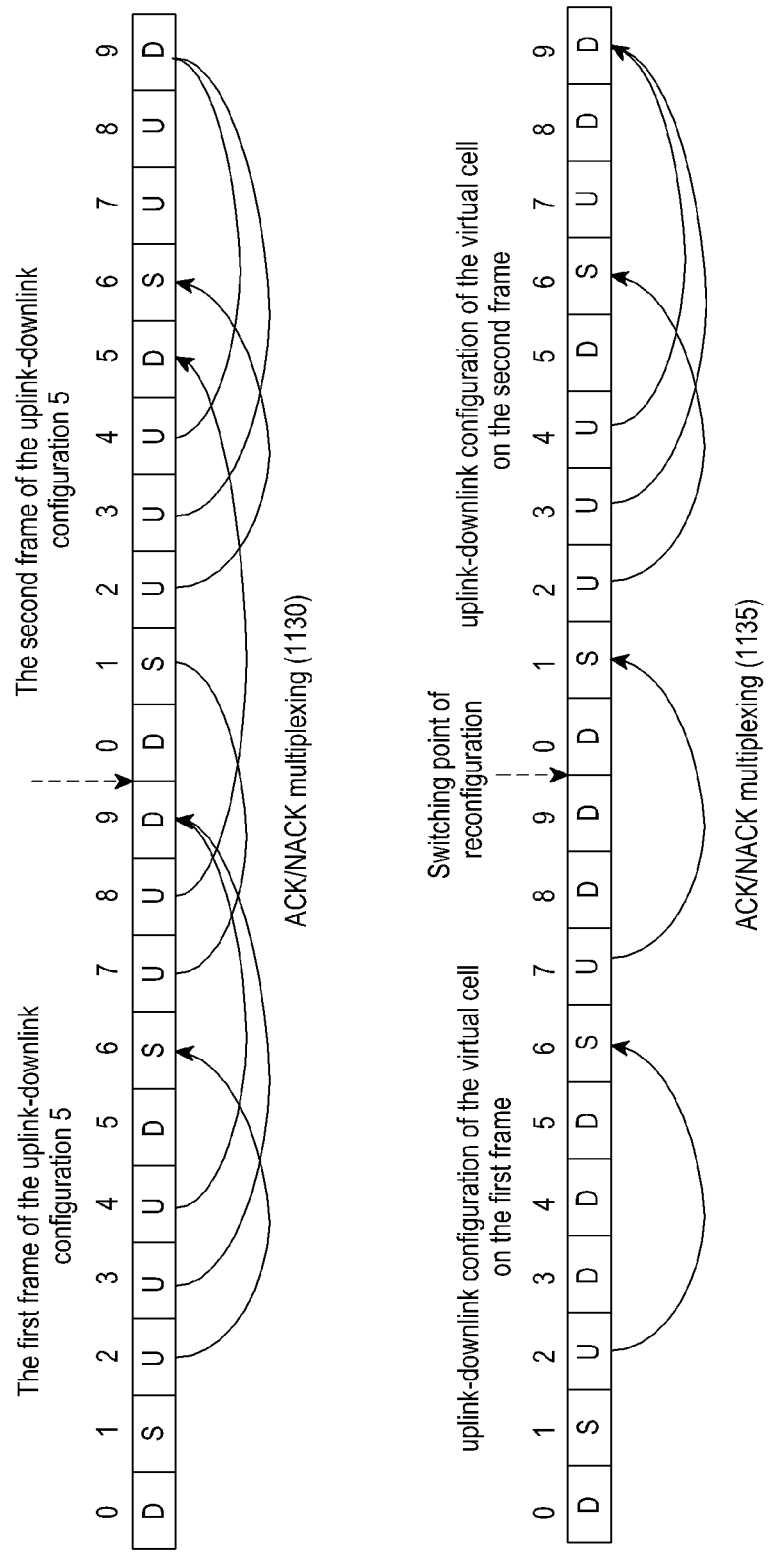
[Fig. 11d]

[Fig. 12a]
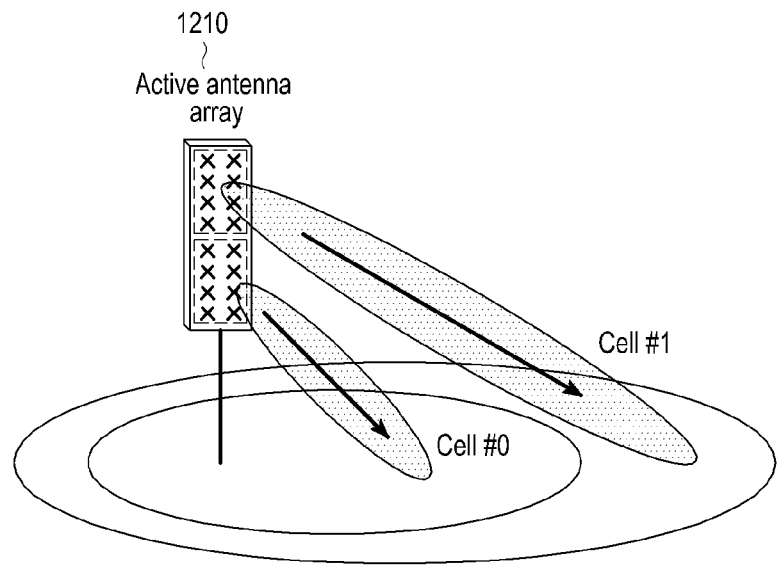
[Fig. 12b]
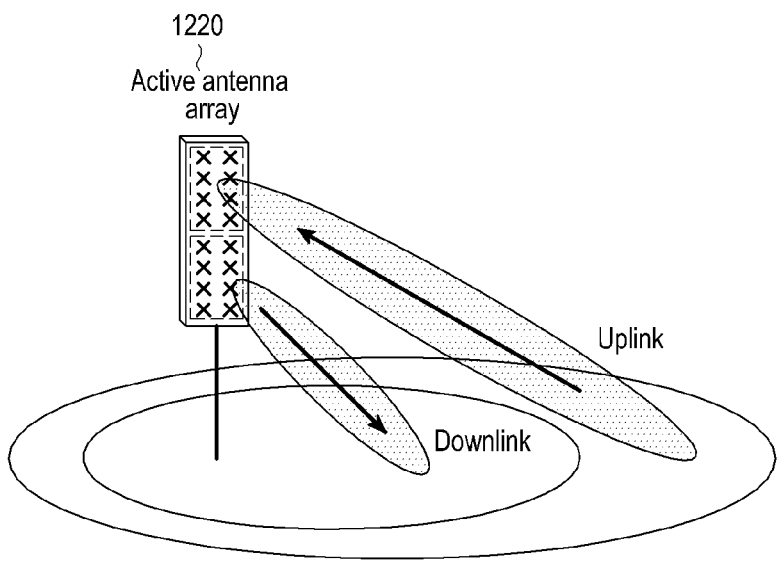

[Fig. 12c]
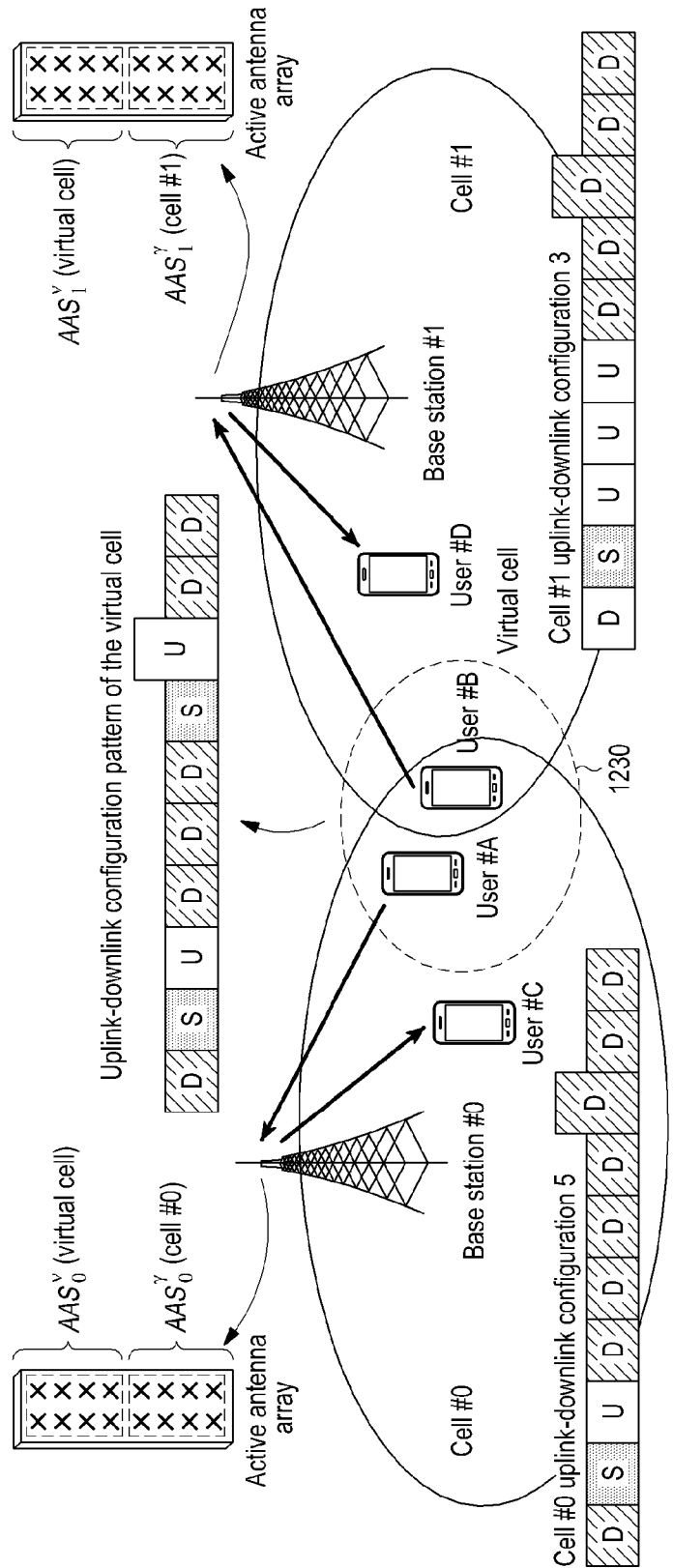

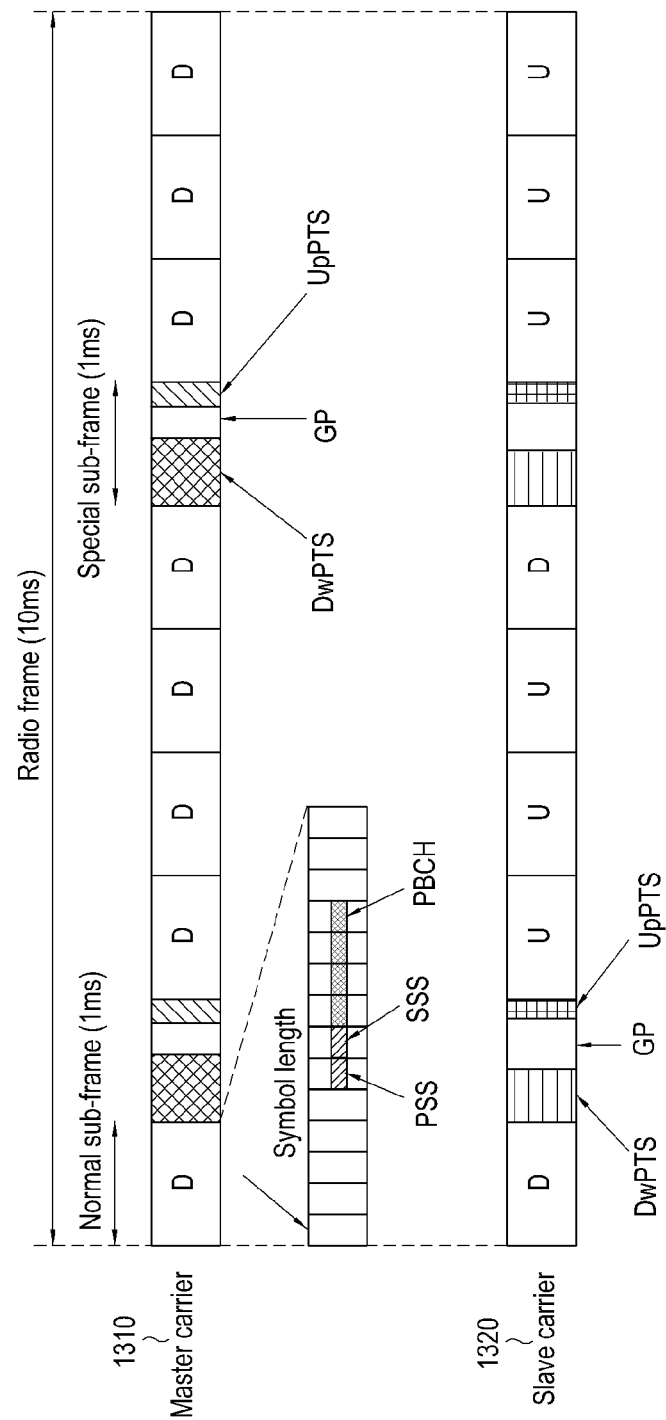
[Fig. 13a]

[Fig. 13b]
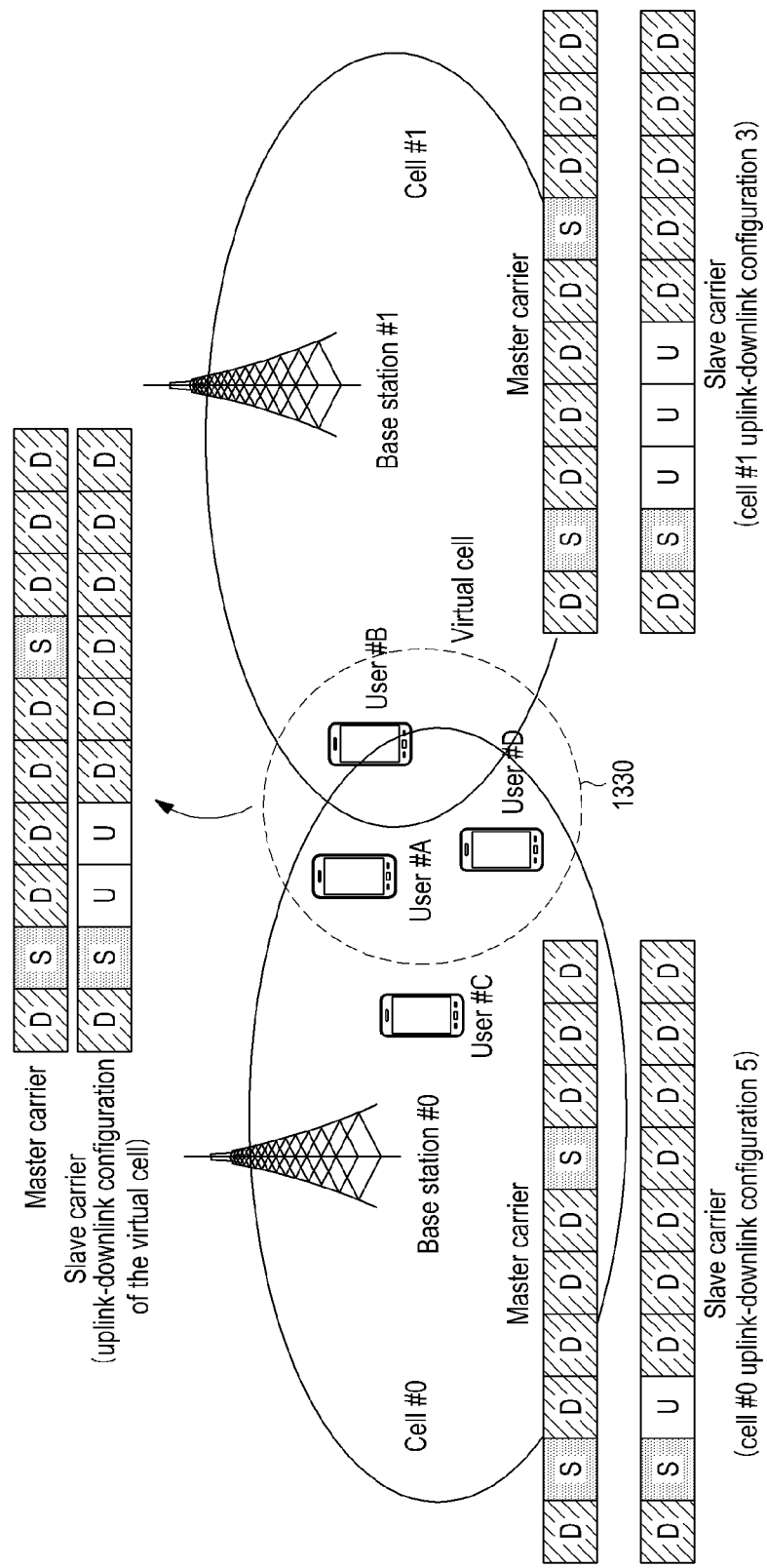

[Fig. 13c]
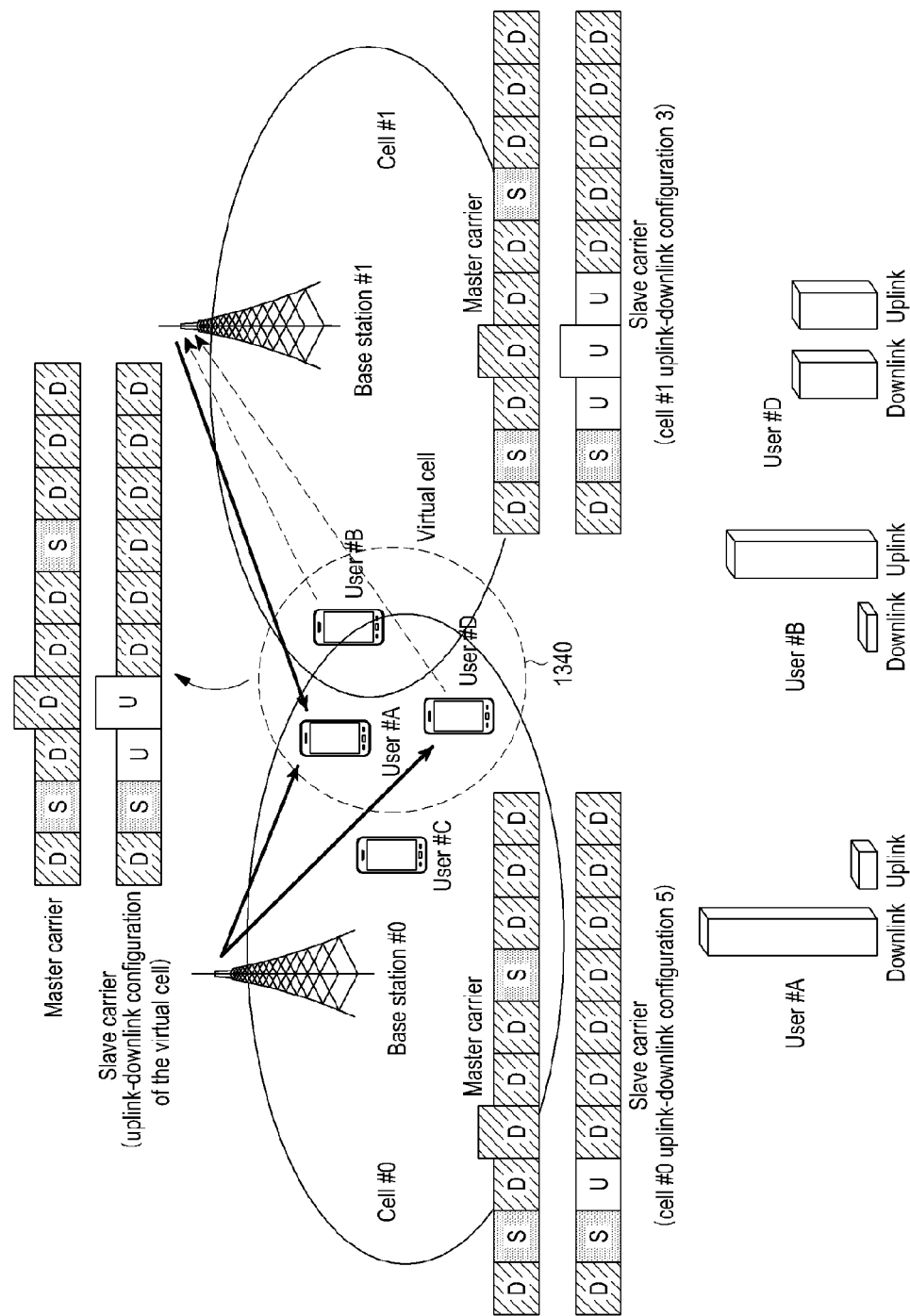
[Fig. 14]
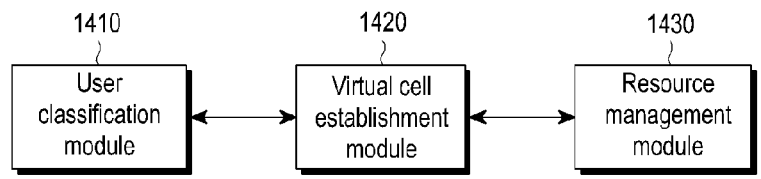

RESOURCE MANAGEMENT METHOD AND APPARATUS

CROSS-REFERENCE TO RELATED APPLICATION(S)

The present application claims priority under 35 U.S.C. § 365 to International Patent Application No. PCT/KR2015/009193 filed Sep. 1, 2015, entitled "RESOURCE MANAGEMENT METHOD AND APPARATUS", and, through International Patent Application No. PCT/KR2015/009193, to Chinese Patent Application No. 201410448542.5 filed Sep. 4, 2014 each of which are incorporated herein by reference into the present disclosure as if fully set forth herein.

TECHNICAL FIELD

The present disclosure relates to wireless communications technologies, and more particularly, to a resource management method and a base station.

BACKGROUND ART

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The next generation mobile communications technology has advantages of very simple network architecture, negligible signal processing and round-trip time delay, and extremely high quality of communications and transmission rate etc. According to different downlink and uplink service multiplexing scenarios, general communications system embodies various duplexing modes, namely, Time Division Duplex (TDD), Frequency Division Duplex (FDD) and Hybrid Division Duplex (HDD).

The TDD mode refers to the scenario that the uplink and downlink transmissions occupy the same frequency band, while they are separated in different transmission intervals. A Guard Period (GP) is inserted between the uplink and the downlink transmission intervals.

The FDD mode refers to the scenario that the uplink and downlink transmissions occupy different frequency bands such that simultaneously transmitted uplink and downlink signals are separated by different carrier frequencies. A Guard Band (GB) is inserted between the frequency bands occupied by the uplink and the downlink.

The HDD mode integrates the TDD mode and the FDD mode, in a cell of which carrier frequencies are constructed in pairs, a user terminal communicates with a base station on a master carrier and a slave carrier according to a predetermined pattern. Specifically, if the sub-frames on the slave carrier are all uplink sub-frames, the user terminal communicates with the base station on the master carrier and the slave carrier in FDD mode; if the slave carrier is time multiplexed of downlink and uplink sub-frames, the user terminal communicates with the base station on downlink resources of the master carrier and uplink resources of the slave carrier in FDD mode, and/or, the user terminal communicates with the base station on downlink resources of the slave carrier and uplink resources of the slave carrier in TDD mode.

FIG. 1 is a schematic diagram illustrating a frame structure of TDD mode in the Long Term Evolution (LTE) system corresponding to the Evolved Universal Terrestrial Radio Access (E-UTRA) protocol developed by the 3rd Generation Partnership Project (3GPP).

Referring to FIG. 1, the length of one radio frame is 10 ms, and one radio frame is composed of ten sub-frames including special sub-frames and normal sub-frames, the length of each sub-frame is 1 ms. The special sub-frames are classified into three intervals, namely a Downlink Pilot Time Slot (DwPTS), a GP used between the uplink and downlink, and an Uplink Pilot Time Slot (UpPTS). The normal sub-frames include uplink sub-frames and downlink sub-frames, which are used to respectively transmit uplink and downlink control channels and data channels. In one radio frame, it is possible to configure two special sub-frames (i.e., sub-frame 1 and sub-frame 6), or configure one special sub-frame (i.e., sub-frame 1). The sub-frame 0, sub-frame 5 and DwPTS in the special sub-frame are always used for downlink transmissions, the sub-frame 2 and UpPTS in the special sub-frame are always used for uplink transmissions, and the other sub-frames can be flexibly configured as either downlink sub-frames or uplink sub-frames according to actual needs.

In particular, the LTE TDD system supports seven uplink-downlink configurations, as shown in table 1, "D" indicates a downlink sub-frame, "U" indicates an uplink sub-frame, and "S" indicates a special sub-frame. It can be seen from table 1 that the ratios of uplink sub-frames to downlink sub-frames of the seven uplink-downlink configurations are different. The uplink-downlink configuration 5 has the most downlink sub-frames, and the ratio of downlink sub-frames to uplink sub-frames is 9:1; the uplink-downlink configuration 0 has the most uplink sub-frames, and the ratio of uplink sub-frames to downlink sub-frames is 3:2.

TABLE 1

| Uplink-downlink configuration index | Downlink-uplink transition period | Sub-frame index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| Uplink-downlink configuration index | Downlink-uplink transition period | Sub-frame index | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In a conventional TDD system, the allocation of uplink and downlink sub-frames is conducted in a static or semi-static manner. The common approach is to determine the ratio of uplink sub-frames to downlink sub-frames according to deployment scenarios and service requirements during the phase of network planning, and remain unchanged. This approach is relatively simple and effective in the scenario where only macro cells are deployed. However, this approach is no longer effective in future 5th Generation (5G) communications system where small cells are densely deployed (so-called Ultra-dense Network (UDN)). In UDN, fewer users exist in each cell, and the change in traffic demands in each cell is very significant. Therefore, there is a need to adaptively adjust the ratio of downlink sub-frames to uplink sub-frames or vice versa to suit for the traffic variations.

In a multi-cell deployment scenario, if different cells adopt the same uplink-downlink configuration or the uplink-downlink transmission directions of adjacent cells are the same at a given time instant, the user terminal and the base station will respectively suffer from inter-cell interference as shown in FIG. 2a and FIG. 2b on an uplink sub-frame and a downlink sub-frame.

FIG. 2a shows the Type-I inter-cell interference 210, namely, on a sub-frame where the adjacent cell performs the downlink transmission, the downlink reception of the user terminal in the cell of interest suffers from interference caused by the downlink transmission of the base station in the adjacent cell.

FIG. 2b shows the Type-II inter-cell interference 220, namely, on a sub-frame where the uplink transmission is performed in the adjacent cell, the uplink signals, which is transmitted by the user terminal, received by the base station of the cell of interest suffer from interference caused by uplink transmission of the user terminal in the adjacent cell.

In addition, in a multi-cell deployment scenario, if adjacent cells adopt different uplink-downlink configurations or the transmission directions of adjacent cells are different at a given time instant, the base station or the user terminal will suffer from inter-cell interference as shown in FIG. 2c.

FIG. 2c shows the Type-III inter-cell interference 230, namely, on a sub-frame where the unlink-downlink transmission directions of adjacent cells are different, the uplink signals, which is transmitted by the user terminal, received by the base station of the cell of interest suffer from interference caused by downlink transmission of the base station in the adjacent cell.

FIG. 2c further shows the Type-IV inter-cell interference 240 as well, namely, on a sub-frame where the unlink-downlink transmission directions of adjacent cells are different, the downlink reception of the user terminal in the cell of interest suffers from interference caused by the uplink transmission of the user terminal in the adjacent cell.

The existence of the so-called cross-slot interference (Type-III and Type-IV interference) restricts the flexibility of dynamically configuring the uplink and downlink sub-frames in the TDD system. To solve above mentioned problem, the 3GPP has initiated a working group (WG), named "Enhancements to LTE Time Division Duplex for Downlink-Uplink Interference Management and Traffic Adaptation (eIMTA)" on May 2010, to investigate methods and associated signaling supports that enable traffic adaptation and interference mitigation in dynamic TDD system. The interference management methods studied by the eIMTA WG include cell clustering, frequency domain multiplexing, power control, and so on. These interference management methods are especially used for eliminating or avoiding the Type-III interference between base stations. This is because the eIMTA WG believes that, compared to the Type-IV interference between user terminals, the Type-III interference between base stations has a far greater impact on the system performance. This is mainly because: 1) the transmit power of the base station is generally higher than that of the user terminal, and channels between base stations are usually Line-of-Sight (LoS) channels; 2) according to the statistical theory, the frequency at which the Type-III interference appears is higher than that of the Type-IV interference appears; 3) the Type-III interference is inter-base-station interference, and is easy to manage and control, while the Type-IV interference is inter-user-terminal interference, and is difficult to manage and control.

In order to improve the system throughput, enhance the spectrum efficiency in future 5G communications system, the deployment of UDN has become a trend. In particular, for the 5G communications system, the consistency between cell-center and cell-edge performances is an important performance indicator to evaluate the overall system performance. Hence, if adjacent cells adopt different uplink-downlink configurations, besides the Type-III inter-base-station interference, the Type-IV inter-user-terminal interference also to a great extent degrades the cell-edge performance of the system. This is due to the fact that with increase in the number of cells and reduction in cell coverage, the equivalent distance between user terminals in different cells will be shortened accordingly. That is to say, if adjacent cells employ different uplink-downlink configurations, the frequency at which the Type-IV interference appears and the interference level in 5G systems is considerably higher than the frequency at which the Type-IV interference appears and the interference level in 4G systems, which cannot be ignored.

In conclusion, regarding the inter-user-terminal cross-slot interference mitigation and asymmetric traffic adaptation of cell-edge user terminals, there have been no effective solutions available in the literature.

DISCLOSURE OF INVENTION

Technical Problem

Accordingly, an aspect of the present invention is to provide a communications method for effectively eliminating and/or avoiding the inter-user-terminal cross-slot interference can be developed, meanwhile satisfying the asymmetric downlink and uplink traffic demands of user terminals (especially cell-edge user terminals).

Another aspect of the present invention is to provide, in current wireless communications system, effective technical solutions for eliminating and/or avoiding the inter-user-terminal cross-slot interference under the scenario that the uplink-downlink resource allocations may be dynamically configured, thereby allowing the flexibility of dynamic configuration of uplink-downlink resources.

Another aspect of the present invention is to provide a resource management method and a base station, so as to improve the cell-edge performance and spectrum efficiency of the wireless communications system, and improve the adaptability of the cell-edge user terminal to the asymmetric uplink-downlink traffic demands.

Solution to Problem

The resource management method provided by an embodiment of the present disclosure includes:

receiving, by a base station, measurement information from a user terminal, determining a cell-edge user;

transmitting, by the base station, information of the cell-edge user in the cell to an adjacent base station, and receiving, from the adjacent base station, information of a cell-edge user in an adjacent cell, according to information of the cell-edge users in the cell and the adjacent cell, establishing, by the base station, a virtual cell including the cell-edge users;

transmitting, by the base station, configuration information of the cell-edge user in the cell and configuration information of the cell to base stations each of which a cell-edge user in the virtual cell is located at, and receiving, from the base stations each of which a cell-edge user in the virtual cell is located at, configuration information of each cell-edge user and configuration information of a cell where the each cell-edge user is located;

configuring, by the base station, uplink-downlink resource allocation and a transmission mode for the virtual cell.

Preferably, wherein the measurement information includes a Reference Signal Receiving Power (RSRP), a Reference Signal Receiving Quality (RSRQ) and a Signal to Interference plus Noise Ratio (SINR) or a combination thereof.

Preferably, wherein determining a cell-edge user includes: classifying, by the base station, a user terminal in the cell as a cell-center user and a cell-edge user according to the measurement information, a predefined threshold and a predefined principle.

Preferably, the method further includes:

respectively configuring, by the base station, a set of candidate cooperative base stations for each user terminal in the cell, initial set of candidate cooperative base stations is an empty set.

for each user terminal, when the relationship between the measurement information of the cell and the adjacent cell measured by the user terminal and the predefined threshold conforms to the predefined principle, adding, by the base station, the base station and a base station where the adjacent cell is located into the set of candidate cooperative base stations of the user terminal;

identifying, by the base station, a user terminal of which the set of candidate cooperative base stations is an empty set as a cell-center user, and identifying a user terminal of which the set of candidate cooperative base stations is not an empty set as a cell-edge user.

Preferably, when transmitting, by the base station, information of the cell-edge user in the cell to the adjacent base station, further comprising: transmitting, by the base station, information of the set of candidate cooperative base stations corresponding to the cell-edge user to all base stations in the set of candidate cooperative base stations;

when receiving, from the adjacent base station, information of a cell-edge user in an adjacent cell, further comprising:

receiving, by the base station from all base stations in the set of candidate cooperative base stations, information of a set of candidate cooperative base stations corresponding to each of cell-edge users.

Preferably, wherein the establishing, by the base station, a virtual cell comprising the cell-edge users includes: grouping, by the base station, cell-edge users of which the sets of candidate cooperative base stations are the same into a virtual cell; the set of candidate cooperative base stations becomes a set of cooperative base stations of the virtual cell, and a cell corresponding to a cooperative base station in the set of cooperative base stations is a cooperative cell.

Preferably, wherein the configuring, by the base station, uplink-downlink resource allocation and a transmission mode for the virtual cell includes:

configuring, by the base station, uplink-downlink resources of which the transmission directions at the same transmission time are the same for all user terminals in the same virtual cell;

wherein the transmission mode includes single-cell transmission and multi-cell cooperative transmission.

Preferably, wherein the information of the cell-edge user and the information of the set of candidate cooperative base stations includes: user-specific Channel State Information (CSI), user-specific Buffer Status Report (BSR), cell-specific load information, cell-specific uplink-downlink configuration information, or a combination thereof.

Preferably, wherein the configuring, by the base station, uplink-downlink resources of which the transmission directions at the same transmission time are the same for all user terminals in the same virtual cell includes:

according to the uplink-downlink configuration information of each cooperative base station, on sub-frames of which the transmission directions are the same, configuring, by the base station, uplink-downlink resources for each user terminal according to the configuration of a serving cell of the user terminal;

according to the uplink-downlink configuration information of each cooperative base station, on sub-frames of which the transmission directions are not consistent with each other, configuring, by the base station, uplink-downlink resources of which the transmission directions are the same for each user terminal.

Preferably, wherein on sub-frames of which the transmission directions are not consistent with each other, configuring, by the base station, uplink-downlink resources of which the transmission directions are the same for each user terminal includes:

on sub-frames of which the transmission directions are not consistent with each other, configuring, by the base station, uplink-downlink resources of which the transmission directions are the same for each user terminal according to a system performance indicator; wherein the system performance indicator comprises one or more of the following indicators: uplink-downlink average throughput and/or spectrum efficiency of each user terminal in the virtual cell, uplink-downlink average throughput and/or spectrum efficiency of all user terminals of the base station and the adjacent base station, the total uplink-downlink resource requirement of all user terminals in the virtual cell and/or uplink-downlink resource utilization rate of each cooperative cell of the virtual cell.

Preferably, the method further includes:
according to a switch request and response procedure between cooperative base stations of the virtual cell configured by the network side, transmitting, by the base station, user data and control information to each of cooperative base stations of the virtual cell, and receiving, from each of the cooperative base stations, user data and control information.

Preferably, wherein the switch request includes transmission direction information of the user terminal at the current time;

wherein the user data and control information is transmitted or received via an X2 interface between the cooperative base stations of the virtual cell.

Preferably, the method further includes:
obtaining, by the base station, configuration information, and configuring an uplink-downlink HARQ timing relationship to be adopted by the user terminals in the virtual cell;
the configuration information comprises uplink-downlink timing reference configuration of the set of cooperative cells.

Preferably, a set of uplink sub-frames of uplink timing reference configurations of the set of cooperative cells is a complete set of all sets of uplink sub-frames of uplink-downlink configurations of all cooperative cells in the set of cooperative cells;
a set of downlink sub-frames of downlink timing reference configurations of the set of cooperative cells is a complete set of all sets of downlink sub-frames of uplink-downlink configurations of all cooperative cells in the set of cooperative cells;
the method further includes: the uplink-downlink HARQ timing relationship to be adopted by the user terminals in the virtual cell follows the uplink-downlink HARQ timing relationship of the uplink-downlink timing reference configuration of the set of cooperative cells.

Preferably, the method further includes: obtaining, by the base station, the uplink-downlink HARQ timing relationship to be adopted by the user terminals in the virtual cell from the network side via downlink control information.

Preferably, the method further includes:
for sub-frames, of the user terminal, suffering from different interference levels, configuring, by the base station, different CSI measurement and feedback mechanisms.

Preferably, the method further includes:
in a Hybrid Division Duplex (HDD) communications system, communicating, by the base station, with each user terminal in the virtual cell on downlink resources of the master carrier, and on uplink resources of the slave carrier.

The base station provided by embodiments of the present disclosure includes: a user classification module, a virtual cell establishment module and a resource management module; wherein, the user classification module is configured to determine a cell-edge user according to measurement information obtained from a user terminal;

the virtual cell establishment module is configured to transmit information of the cell-edge user in the cell to an adjacent base station, and receive, from the adjacent base station, information of a cell-edge user in an adjacent cell, according to information of the cell-edge users in the cell and the adjacent cell, establish a virtual cell comprising the cell-edge users;

the resource management module is configured to transmit configuration information of the cell-edge user in the cell and configuration information of the cell to base stations each of which a cell-edge user in the virtual cell is located at, and receive, from the base stations each of which a cell-edge user in the virtual cell is located at, configuration information of each cell-edge user and configuration information of a cell where the each cell-edge user is located; and configure uplink-downlink resource allocation and a transmission mode for the virtual cell.

As can be seen from the above technical solutions, in the present disclosure, a base station obtains measurement information from a user terminal and determines a cell-edge user according to the measurement information, performs information exchange with an adjacent base station, and establishes a virtual cell including the cell-edge user. Finally, the base stations at each of which a cell-edge user in the virtual cell is located perform information exchange with each other to configure the uplink-downlink resource allocation and a transmission mode for the virtual cell. Thus by establishing a virtual cell and performing user-centric resource management in the virtual cell, the cross-slot interference between cell-edge user terminals is effectively avoided, meanwhile, the asymmetric uplink-downlink traffic requirements of the cell-edge user terminals can be satisfied, and then the cell-edge performance and spectrum efficiency of the future wireless communications system can be improved.

BRIEF DESCRIPTION OF DRAWINGS

The above and other aspects, features, and advantages of certain embodiments of the present invention will be more apparent from the following detailed description taken in conjunction with the accompanying drawings, in which:

FIG. 1 is a schematic diagram illustrating frame structure in TD-LTE system;

FIG. 2a is a schematic diagram illustrating type-I inter-cell interference;

FIG. 2b is a schematic diagram illustrating type-II inter-cell interference;

FIG. 2c is a schematic diagram illustrating type-III and type-IV inter-cell interference;

FIG. 3 is a flowchart illustrating a method for managing uplink-downlink resources of a virtual cell according to an example of the present disclosure;

FIG. 4 is a flowchart illustrating a method for determining a cell-center user and a cell-edge user according to an example of the present disclosure;

FIG. 5 is a schematic diagram illustrating a method for establishing a virtual cell according to an example of the present disclosure;

FIG. 6 is a flowchart illustrating a method for configuring, scheduling and transmitting the uplink-downlink resources of the virtual cell according to an example of the present disclosure;

FIG. 7 is a schematic diagram illustrating a pattern of an uplink-downlink configuration of the virtual cell, a homogeneous sub-frame and a heterogeneous sub-frame according to an example of the present disclosure;

FIG. 8a is a schematic diagram illustrating a transmission method of a virtual cell according to a first example of the present disclosure for a given homogeneous sub-frame pattern;

FIG. 8b is a schematic diagram illustrating an uplink transmission method of a virtual cell according to the first example of the present disclosure for a given heterogeneous sub-frame pattern;

FIG. 8c is a schematic diagram illustrating a downlink transmission method of a virtual cell according to the first example of the present disclosure for a given heterogeneous sub-frame pattern;

FIG. 8d is a schematic diagram illustrating the system level simulation results of downlink cell-edge throughout according to the first example of the present disclosure;

FIG. 8e is a schematic diagram illustrating the system level simulation results of uplink cell-edge throughout according to the first example of the present disclosure;

FIG. 9 is a schematic diagram illustrating a method of configuring uplink-downlink resource allocation of the virtual cell according to the traffic requirement of the virtual cell in a second example of the present disclosure;

FIG. 10 is a schematic diagram illustrating a method of configuring uplink-downlink resource allocation of the virtual cell according to the resource utilization rate of each cooperation cell of the virtual cell in a third example of the present disclosure;

FIGS. 11a and 11b are a schematic diagram illustrating a method of configuring uplink-downlink resource allocation of the virtual cell according to the traffic requirement of the virtual cell and the resource utilization rate of each cooperation cell of the virtual cell in a fourth example of the present disclosure;

FIG. 11c is a schematic diagram illustrating a downlink timing relationship of the virtual cell according to the fourth example of the present disclosure;

FIG. 11d is a schematic diagram illustrating an uplink timing relationship of the virtual cell according to the fourth example of the present disclosure;

FIG. 12a is a schematic diagram illustrating the vertical sectorization in an active antenna system according to a fifth example of the present disclosure;

FIG. 12b is a schematic diagram illustrating the separation of uplink-downlink transmission in the active antenna system according to the fifth example of the present disclosure;

FIG. 12c is a schematic diagram illustrating a method of configuring uplink-downlink resource allocation of the virtual cell in the active antenna system according to the fifth example of the present disclosure;

FIG. 13a is a schematic diagram illustrating the frame structure in a preferable hybrid division duplex communications system according to a sixth example of the present disclosure;

FIG. 13b is a schematic diagram illustrating a method of configuring uplink-downlink resource allocation of the virtual cell in the preferable hybrid division duplex communications system according to the sixth example of the present disclosure;

FIG. 13c is a schematic diagram illustrating a method of configuring uplink-downlink resource allocation of the virtual cell in the preferable hybrid division duplex communications system according to the sixth example of the present disclosure;

FIG. 14 is a schematic diagram illustrating a base station according to an example of the present disclosure.

Throughout the drawings, like reference numerals will be understood to refer to like parts, components, and structures.

MODE FOR THE INVENTION

In order to make objectives, technical solutions and advantages of the present disclosure clearer, the present disclosure will be described in detail hereinafter with reference to accompanying drawings.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Additionally, operation steps of the procedures described herein and combinations of the procedures described herein may be performed by computer program instructions. Since the computer program instructions may be equipped in a processor of a general-use computer, a special-use computer, or other programmable data processing devices, the instructions executed through a processor of a computer or other programmable data processing devices may perform the steps described in connection with the procedures described herein. Since the computer program instructions may be stored in a computer-available or computer-readable memory that may be oriented to a computer or other programmable data processing devices to implement a function in a specified manner, the instructions stored in the computer-available or computer-readable memory may produce a product for providing instructions for performing the procedures described herein. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the procedures described herein.

Further, each step of the procedures described herein may represent a module, segment, or part of a code including one or more executable instructions for executing a specified logical function. Further, it should also be noted that in some replacement execution examples, the steps of the procedures described herein may occur in different orders. For example, two steps that are consecutively illustrated may also be performed substantially simultaneously or in a reverse order, depending on the corresponding procedure.

As used herein, the term "unit" may mean a software element or a hardware element such as a field-programmable gate array (FPGA) or an application specific integrated circuit (ASIC, but is not limited thereto. A unit may be configured in a storage medium that may be addressed or may be configured as one or more processors.

Accordingly, as an example, a unit may include elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub units. Further, an element or a unit may be implemented to reproduce one or more central processing units (CPUs) in a device or a multimedia card.

In order to improve the cell-edge throughput performance of the communications system and the self-adaptability of the system to asymmetric uplink and downlink traffic demands, the present disclosure provides a technical solution including establishing a virtual cell and flexibly configuring the uplink-downlink resource allocation of the virtual cell. The main idea of the technical solution is: a base station determines cell-edge users according to necessary information measurements reported by user terminals, a virtual cell including the cell-edge users is established via information exchange between base stations, which dynamically configure the uplink and downlink resource allocation of the virtual cell, and the associated transmission modes.

The technical solution of the present disclosure is applicable to the TDD system (such as the TD-LTE system) as well as other systems requiring to dynamically adjust the uplink-downlink sub-frame configuration, such as the TD-SCDMA system and subsequent evolution systems thereof, the Worldwide Interoperability for Microwave Access (Wi-MAX) system and subsequent evolution systems thereof, the HDD system and subsequent evolution systems thereof.

FIG. 3 is a flowchart illustrating a method configuring uplink-downlink resources of a virtual cell according to an example of the present disclosure. As shown in FIG. 3, the method includes the following operations.

In block 301, a base station obtains measurements of received signals and interference levels of its serving user terminals, according to the measurements, a predetermined threshold and a predetermined criterion, categorizes the serving users of the cell into cell-center users and cell-edge users; simultaneously, the base station determines a set of candidate cooperative base stations of each cell-edge user.

In block 302, base stations exchange necessary information with each other; via the information exchange, a virtual cell is established; meanwhile, the base station determines its serving virtual cell. The base stations that serve the same virtual cell form the set of cooperative base stations of the virtual cell.

The information exchanged between base stations includes: the base station transmits information of the cell-edge users and information of the corresponding set of candidate cooperative base stations to each other base station in the set of candidate cooperative base stations. The information exchange between base stations may be achieved via an X2 interface between base stations, or via centralized processing.

In block 303, information exchange is performed between cooperative base stations of the virtual cell, and the cooperative base stations cooperatively configure the uplink-downlink resources of the virtual cell according to a set of system performance indicators. The principle of this resource configuration is to guarantee the consistency of transmission directions of user terminals in the virtual cell at any given time instant.

The information exchanged between cooperative base stations of the virtual cell includes: exchanging user-specific Channel State Information (CSI), user-specific Buffer Status Report (BSR), cell-specific load information, cell-specific uplink-downlink configuration information or any combination thereof.

The system performance indicator includes one or more of the following indicators:

uplink-downlink average throughput and/or spectrum efficiency of each user terminal in the virtual cell, uplink-downlink average throughput and/or spectrum efficiency of all user terminals of the base station and the adjacent base stations, the overall uplink-downlink resource requirement of all user terminals in the virtual cell and/or uplink-downlink resource utilization rate of each cooperative cell of the virtual cell The method of determining the cell-center users and the cell-edge users by the base station of the cell in block 301 will be described hereinafter with reference to FIG. 4.

FIG. 4 is a flowchart illustrating a method for determining a cell-center user and a cell-edge user according to an example of the present disclosure.

Referring to FIG. 4, in block 401, the base station initializes the set of candidate cooperative base stations of each user terminal of the cell. The initialized set of candidate cooperative base stations is an empty set.

In block 402, each user terminal measures Reference Signal Receiving Power (RSRP), Reference Signal Receiving Quality (RSRQ) and Signal to Interference plus Noise Ratio (SINR) or a combination thereof of the current serving cell and adjacent cells of the serving cell, and reports the measurements to the current serving base station.

In block 403, the base station obtains the measurements of the RSRP, RSRQ, SINR or a combination thereof of the serving cell and the adjacent cells reported by the user terminals of the cell, and according to a predetermined threshold, the base station updates the set of candidate cooperative base stations of the user terminals of the cell.

In block 404, the base station categories the user terminals of the cell after the sets of candidate cooperative base stations of the user terminals have been finished updating. Specifically, the user whose set of candidate cooperative base stations is still an empty set is identified as a cell-center user, the user whose set of candidate cooperative base stations is not an empty set is identified as a cell-edge user.

In block 405, after the base station have categorized the user terminals of the cell into cell-center and cell-edge users, the base station transmits information of the cell-edge users and information of the corresponding set of candidate cooperative base stations to each other base stations in the set of candidate cooperative base stations. The information of the cell-edge users includes user identity information, BSR, and so on. The information of the corresponding set of candidate cooperative base stations includes cell identity information, uplink-downlink configuration information, cell-specific load information, and the like. The information exchange between base stations may be achieved via an X2 interface between base stations, or via centralized processing.

The blocks 403 and 404 will be described in detail hereinafter with reference to accompanying drawings and tables according to an example.

FIG. 5 is a schematic diagram illustrating a method for establishing a virtual cell according to an example of the present disclosure.

As shown in FIG. 5, the communications system includes two cells, namely cell #0 and cell #1, respectively. Cell #0 serves user #A and user #C, and cell #1 serves user #B. Cell #0 and cell #1 are adjacent to each other, namely cell #0 is an adjacent cell of cell #1, and cell #1 is an adjacent cell of cell #0. Take RSRP measurement as an example, user #A measures RSRP values of the serving cell #0 and the adjacent cell #1, obtains $RSRP_{0,0}^A$ and $RSRP_{0,1}^A$, and reports $RSRP_{0,0}^A$ and $RSRP_{0,1}^A$ to the serving cell #0. User #C measures RSRP values of the serving cell #0 and the adjacent cell #1, obtains $RSRP_{0,0}^C$ and $RSRP_{0,1}^C$, and reports $RSRP_{0,0}^C$ and $RSRP_{0,1}^C$ to the serving cell #0. User #B measures RSRP values of the serving cell #1 and the adjacent cell #0, obtains $RSRP_{1,1}^B$ and $RSRP_{1,0}^B$, and reports $RSRP_{1,1}^B$ and $RSRP_{1,0}^B$ to the serving cell #1. After cell #0 and cell #1 respectively obtain the RSRP values of their serving users thereof, according to a predetermined threshold τ, cell #0 and cell #1 respectively update the set of candidate cooperative base stations of each serving user thereof, and categorizes the users thereof, as shown in table 2.

TABLE 2

| User | Serving cell | RSRP value is compared with $\tau$ | Set of candidate cooperative base stations before updating | Set of candidate cooperative base stations after updating | User category |
|---|---|---|---|---|---|
| #A | #0 | $RSRP_{0,0}^A - RSRP_{0,1}^A < \tau$ | { } | {#0, #1} | edge |
| #B | #1 | $RSRP_{1,1}^B - RSRP_{1,0}^B < \tau$ | { } | {#0, #1} | edge |
| #C | #0 | $RSRP_{0,0}^C - RSRP_{0,1}^C > \tau$ | { } | { } | center |

For example, cell #0 compares the RSRP values $RSRP_{0,0}^A$ and $RSRP_{0,1}^A$ reported by the user #A with the predetermined threshold $\tau$, and obtains $RSRP_{0,0}^A - RSRP_{0,1}^A < \tau$, then cell #0 updates the set of candidate cooperative base stations of user #A with {cell #0, cell #1}. The updated set of candidate cooperative base stations of user #A is not an empty set, and then cell #0 identifies user #A as a cell-edge user. Similarly, user #B is identified by cell #1 as a cell-edge user, and user #C is identified by cell #0 as a cell-center user. It should be noted that, under a given network topology and user distribution, the value of the predetermined threshold $\tau$ directly affects the result of the cell-center user and cell-edge user categorization, and therefore, the associated system performance. The value of the threshold $\tau$ may be statically or quasi-statically configured according to the long-term statistics information of the network, or be dynamically configured by the network side according to instant feedback information of the user terminal. The specific method for determining the threshold $\tau$ is not limited by the present disclosure, and the method for comparing measurement values reported by the user with the threshold $\tau$ is not limited by the present disclosure too.

The method for establishing the virtual cell in block 302 will be described hereinafter with reference to accompanying drawings and tables according to an example.

After the base station has categorized the user terminals into either cell-center users or cell-edge users, the base station transmits information of the cell-edge users and information of the set of candidate cooperative base stations corresponding to the cell-edge users to each other base stations in the set of candidate cooperative base stations. Take the users' categorization results shown in FIG. 5 and table 2 as examples, cell #0 transmits information of user #A and information of the set of candidate cooperative base stations of user #A to cell #1, similarly, cell #1 transmits information of user #B and information of the set of candidate cooperative base stations of user #B to cell #0. After the information exchange is completed, cell #0 and cell #1 learn that they are cooperative base stations of both user #A and user #B; meanwhile, a virtual cell 510 including both user #A and user #B is established, as shown in FIG. 5. Base station #0 and base station #1 are cooperative base stations of the virtual cell 510, as shown in table 3.

TABLE 3

| Users in the virtual cell | Set of cooperative base stations of the virtual cell |
|---|---|
| Users #A, #B | Base stations #0, #1 |

The methods of uplink-downlink configuration, scheduling and transmission modes selection of the virtual cell in block 303 will be described hereinafter with reference to FIG. 6.

FIG. 6 is a flowchart illustrating a method for configuring, scheduling and transmitting the uplink-downlink resources of the virtual cell according to an example of the present disclosure.

Referring to FIG. 6, in block 601, a user terminal in the virtual cell measures CSI, and feeds the CSI back to the current serving base station. In addition, the user terminal in the virtual cell reports current BSR of the user terminal to the current serving base station.

In block 602, after a cooperative base station of the virtual cell receives information fed back by the user terminal, the cooperative base station exchanges necessary system configuration information and system statistics information with other base stations in the set of cooperative base stations. The information includes user-specific CSI, user-specific BSR, cell-specific load information, cell-specific uplink-downlink configuration information, or a combination thereof. The information exchange between cooperative base stations may be achieved via an X2 interface between the base stations, or via centralized processing.

In block 603, after obtaining the exchanged information, the cooperative base stations jointly determine the uplink-downlink configuration, scheduling and transmission methods of the virtual cell. During the process, a target base station of the user terminal in the virtual cell is determined. Simultaneously, the target base station reserves uplink-downlink resources for a corresponding user in the virtual cell.

In block 604, according to the determined uplink-downlink configuration, scheduling and transmission methods of the virtual cell, the cooperative base stations establish a switch request and response procedure for a relevant user terminal in the virtual cell. Specifically, the current serving base station of the relevant user terminal in the virtual cell transmits a switch request to the target base station. The switch request includes current transmission direction information of the user terminal. The target base station establishes a switch request and response with the current serving base station according to the switch request information, uplink-downlink resource configuration information, load information, and so on.

In block 605, after the switch request and response is established by the current serving base station and the target base station of the relevant user in the virtual cell, the system reconfigures the radio link between the relevant user in the virtual cell and the target base station. Meanwhile, the current serving base station transmits data and control information of the relevant user in the virtual cell to the target base station. The data and control information may be sent via an X2 interface between the base stations, or be processed via a centralized processing method.

In block 606, the cooperative base stations of the virtual cell allocate uplink-downlink resources for each user in the virtual cell, and perform uplink and downlink transmission.

The uplink-downlink transmission mode may be a single-cell transmission mode, or a multi-cell cooperative transmission mode. It should be guaranteed that the uplink-downlink transmission directions of users in the virtual cell are consistent at any given time instant, thus the inter-user Type-IV interference in the virtual cell can be avoided.

Before the technical solutions of the present disclosure are described in detail with reference some examples, an uplink-downlink configuration pattern, a homogeneous sub-frame and a heterogeneous sub-frame of the virtual cell are defined first in the present disclosure.

Each cooperative base station of the virtual cell, according to an uplink-downlink configuration adopted by the cooperative base station, determines an uplink-downlink configuration pattern of the virtual cell, and according to an interference pattern of the uplink-downlink configuration pattern of the virtual cell, classifies the uplink-downlink configuration pattern into homogeneous sub-frames and heterogeneous sub-frames.

The pattern of uplink-downlink configuration, homogeneous sub-frame and heterogeneous sub-frame of a given virtual cell will be described with reference to accompanying drawings.

FIG. 7 is a schematic diagram illustrating a pattern of an uplink-downlink configuration of the virtual cell, a homogeneous sub-frame and a heterogeneous sub-frame according to an example of the present disclosure.

As shown in FIG. 7, user #A and user #B compose a virtual cell 710, and both cell #0 and cell #1 are cooperative cells of the virtual cell 710. Cell #0 and cell #1 respectively adopt uplink-downlink configuration 5 and uplink-downlink configuration 3 to perform uplink-downlink transmission, therefore the uplink-downlink configuration pattern of the virtual cell 710 is a combination of uplink-downlink configuration 5 and uplink-downlink configuration 3. The sub-frames in the uplink-downlink configuration pattern whose transmission directions are the same are categorized as homogeneous sub-frames, and those whose transmission directions are different are categorized as heterogeneous sub-frames. Each combination part corresponding to the length of one sub-frame in the uplink-downlink configuration pattern is called a sub-frame pattern. Sub-frame pattern that constitutes only homogeneous sub-frames is referred as homogeneous sub-frame pattern while sub-frame pattern that comprises only heterogeneous sub-frames is named as heterogeneous sub-frame pattern.

The technical solutions of the present disclosure are described in detail with reference some preferable examples.

A First Example

FIG. 8a is a schematic diagram illustrating a transmission method of a virtual cell according to a first example of the present disclosure for a given homogeneous sub-frame pattern.

As shown in FIG. 8a, user #A and user #B compose a virtual cell 810, and both cell #0 and cell #1 are cooperative cells of the virtual cell 810. Cell #0 and cell #1 respectively employ uplink-downlink configuration 5 and uplink-downlink configuration 3 to perform uplink-downlink transmission, therefore the uplink-downlink configuration pattern of the virtual cell 810 is a combination of uplink-downlink configuration 5 and uplink-downlink configuration 3. The allocation of uplink-downlink resources of the virtual cell 810 are jointly configured by the cooperative base station #0 and the cooperative base station #1 of the virtual cell 810. That is to say, the users in the virtual cell 810 may flexibly utilize the uplink-downlink resources of the cooperative cells of the virtual cell 810.

When the sub-frame pattern in the uplink-downlink configuration pattern of the virtual cell is a homogeneous sub-frame pattern, the users in the virtual cell may utilize the uplink-downlink resources of the serving cell according to a conventional transmission method. For example, as shown in FIG. 8a, the first sub-frame in the uplink-downlink configuration pattern of the virtual cell 810 is a homogeneous downlink sub-frame, user #A may directly utilize the downlink resources of the serving cell #0, similarly, user #B may also be directly scheduled on the downlink resources of the serving cell #1 to complete the transmission of the downlink sub-frame.

In addition, when the sub-frame pattern in the uplink-downlink configuration pattern of the virtual cell is a homogeneous sub-frame pattern, the users in the virtual cell may utilize the uplink-downlink resources of the cooperative cells according to the Coordinated Multi-point (CoMP) transmission method. For example, as shown in FIG. 8a, user #A may simultaneously be scheduled on the downlink resources of the cooperative cell #0 and the cooperative cell #1 by adopting CoMP Joint Processing (JP) and/or Coordinated Scheduling/Beam forming (CS/CB) transmission mode. From the perspective of virtual cell 810, for a given homogeneous sub-frame pattern, the uplink-downlink transmission direction of the virtual cell 810 is consistent with the uplink-downlink transmission directions of the cooperative cells. Above mentioned method is applicable to the scenario that a homogeneous sub-frame in the virtual cell is an uplink homogeneous sub-frame.

When the sub-frame pattern in the uplink-downlink configuration pattern of the virtual cell is a heterogeneous sub-frame pattern, the users in the virtual cell may utilize the uplink-downlink resources of the cooperative cells in a specified manner, and guarantee that the uplink-downlink transmission directions of all users in the virtual cell are consistent with each other at any given time instant.

FIG. 8b is a schematic diagram illustrating an uplink transmission method of a virtual cell according to the first example of the present disclosure for a given heterogeneous sub-frame pattern, and FIG. 8c is a schematic diagram illustrating a downlink transmission method of a virtual cell according to the first example of the present disclosure for a given heterogeneous sub-frame pattern.

As shown in FIG. 8b, the fourth sub-frame in the uplink-downlink configuration pattern of the virtual cell 820 is a homogeneous uplink/downlink sub-frame, user #A and user #B in the virtual cell 820 may simultaneously transmit on the uplink resources of the cooperative cell #1 according to a specified mode, to perform the uplink transmission. Similarly, as shown in FIG. 8c, the fifth sub-frame in the uplink-downlink configuration pattern of the virtual cell 830 is a heterogeneous uplink/downlink sub-frame, user #A and user #B in the virtual cell 830 may simultaneously be scheduled on the downlink resources of the cooperative cell #0 according to a specified mode, to perform the downlink transmission. From the virtual cell's perspective, for a given heterogeneous sub-frame pattern, the uplink-downlink transmission direction of the virtual cell is consistent with the uplink-downlink transmission direction of at least one cooperative cell among the set of cooperative cells of the virtual cell.

Above mentioned method is also applicable to the scenario that there are more than two cooperative cells. It should be noted that, in this scenario, when the sub-frame pattern in the uplink-downlink configuration pattern of the virtual cell is a heterogeneous sub-frame pattern, the users in the virtual cell may simultaneously utilize the uplink-downlink resources of one of the cooperative cells according to a specified mode. Furthermore, the users in the virtual cell may also utilize the uplink-downlink resources of multiple cooperative cells, whose uplink-downlink transmission directions are the same, according to a specific mode by utilizing CoMP transmission method. To avoid redundancy, there are no further descriptions regarding the scenario.

As can be seen from the example, by jointly configuring the uplink and downlink sub-frames of a virtual cell, and guaranteeing that uplink??downlink transmission directions of all users in the virtual cell for any given time instant are the same, the inter-user cross-slot interference in the virtual cell may be avoided entirely.

In addition, in order to further validate the benefits of above mentioned method, the example of the present disclosure also provides system level simulation results. In the system level simulation parameter configuration, a network topology includes 19 sites each of which has a hexagon coverage area. The inter-site distance (ISD) is set as 500 m. Each site includes three sectors. In the coverage area of each sector, four cells are uniformly distributed. The radius of each cell is set as 40 m, and ten user terminals are uniformly distributed in each cell, and the minimum distance between a user terminal and a cell base station is set as 10 m. The data traffic model is File Transfer Protocol (FTP) traffic model 1 developed by the 3GPP. The data packet size is fixed as 0.5 Mbytes, and the ratio of the arrival rate $\lambda_{DL}$ of downlink data packets to the arrival rate $\lambda_{UL}$ of uplink data packets is 2:1, namely, $\lambda_{DL}:\lambda_{UL}$=2:1. Upon arrival, the data packets are allocated to each user terminal in a random manner with equal probability. Other simulation assumptions and system parameters may refer to relevant settings and descriptions in 3GPP TR 36.828.

The system level simulation in the example provides simulation results of four conventional methods including: method one: static uplink-downlink configuration; method two: cell-specific dynamic uplink-downlink configuration; method three: cell-cluster-specific dynamic uplink-downlink configuration; method four: multi-point cooperative scheduling in frequency domain. Specifically, in method one, all cells employ the same uplink-downlink configuration 1 without any dynamic adjustment. In method two, each cell independently adjusts its uplink-downlink configuration in a dynamic manner, and the time-scale of dynamic configuration is 10 ms. In method three, the cells with strong mutual interference are grouped into the same cell cluster, each cell cluster independently adjusts the uplink-downlink configuration in a dynamic manner, and the times-scale of dynamic configuration is 10 ms. In method four, each cell independently and dynamically adjusts the uplink-downlink configuration of the cell, and the time-scale of dynamic configuration is 10 ms; the cells with strong mutual interference are grouped into the same cell cluster, the cells in the same cell cluster cooperatively separate the user terminals with strong cross-slot interference in the frequency domain, namely, schedule the user terminals with strong cross-slot interference on different frequency resources. Furthermore, the system level simulation in the example provides a simulation result of the method of the present disclosure. In the method of the present disclosure, each cell independently and dynamically adjusts the uplink-downlink configuration of the cell, and the time-scale of dynamic configuration is 10 ms; the users in a virtual cell may flexibly utilize the uplink-downlink resources of the cooperative cells and it ought to be guaranteed that the uplink-downlink transmission directions of all users in the virtual cell are consistent for any given time instant.

FIG. 8*d* and FIG. 8*e* respectively show the system level simulation results of downlink cell-edge throughout and uplink cell-edge throughout in the first example. In the example, the cell-edge throughout is defined as the 5th-percentile point of the Cumulative Density Function (CDF) of the average throughput of all cell users. It can be seen from the simulation results that, compared with the conventional methods, the method of the present disclosure 840 and 850 has a significant improvement on both the uplink and downlink cell-edge throughput performances. In particular, the performance improvement is especially significant when the traffic load is relatively low. For instance, when $\lambda_{DL}$=2, compared with method one and method two, the method of the present disclosure provides an uplink cell-edge throughput gain by 25% and 31%, respectively.

A Second Example

FIG. 9 is a schematic diagram illustrating a method of configuring uplink-downlink resource allocation of the virtual cell according to the traffic requirement of the virtual cell in a second example of the present disclosure.

As shown in FIG. 9, user #A and user #B compose a virtual cell 910, and both cell #0 and cell #1 are cooperative cells of the virtual cell 910. Cell #0 and cell #1 respectively adopt uplink-downlink configuration 5 and uplink-downlink configuration 3 to perform uplink-downlink transmission, therefore the uplink-downlink configuration pattern of the virtual cell 910 is a combination of uplink-downlink configuration 5 and uplink-downlink configuration 3. The allocation of uplink-downlink resources of the virtual cell 910 are jointly configured by the cooperative base station #0 and the cooperative base station #1 of the virtual cell 910. That is to say, the users in the virtual cell 910 may flexibly utilize the uplink-downlink resources of the cooperative cells of the virtual cell 910.

When the sub-frame pattern in the uplink-downlink configuration pattern of the virtual cell is a homogeneous sub-frame pattern, the users in the virtual cell may utilize the uplink-downlink resources of the serving cell according to a conventional transmission method. In addition, when the sub-frame pattern in the uplink-downlink configuration pattern of the virtual cell is a homogeneous sub-frame pattern, the users in the virtual cell may utilize the uplink-downlink resources of the cooperative cells of the virtual cell in a CoMP transmission mode as well. From the virtual cell's perspective, for a given homogeneous sub-frame pattern, the uplink-downlink transmission direction of the virtual cell is consistent with the uplink-downlink transmission direction of the cooperative cells of the virtual cell.

When the sub-frame pattern in the uplink-downlink configuration pattern of the virtual cell is a heterogeneous sub-frame pattern, the users in the virtual cell may utilize the uplink-downlink resources of the cooperative cells according to a specified manner such that the uplink-downlink transmission directions of all users in the virtual cell are consistent with each other for any given time instant. In the example, each cooperative cell of the virtual cell, according to the uplink-downlink resource requirement of the virtual cell, allocates preferable uplink and downlink resources to the user terminals in the virtual cell to perform uplink-downlink transmission.

As shown in FIG. 9, the downlink resource requirements of user #A in the virtual cell are twice of the uplink resource requirements of user #A, the uplink resource requirements of user #B in the virtual cell are twice of the downlink resource requirements of user #B, and the total uplink resource requirements of user #A and user #B are the same as the total downlink resource requirements of user #A and user #B. Therefore, from the virtual cell's perspective, the requirements of uplink and downlink resources are almost the same. Since the ratio of uplink homogeneous sub-frames to downlink homogeneous sub-frames of the virtual cell has been set, each cooperative cell of the virtual cell may satisfy the uplink-downlink traffic requirement of the virtual cell by flexibly configuring the ratio of uplink heterogeneous sub-frames to downlink heterogeneous sub-frames, scheduling and transmission mode selection of the heterogeneous sub-frames of the virtual cell.

As shown in FIG. 9, the ratio of uplink homogeneous sub-frames to downlink homogeneous sub-frames in the virtual cell is 1:7, and the ratio of uplink traffic requirements to downlink traffic requirements of the virtual cell is 1:1. In order to better satisfy the uplink-downlink resource requirements of the virtual cell, each cooperative cell of the virtual cell configures all the heterogeneous sub-frames of the virtual cell as uplink sub-frames, to manipulate the ratio of uplink sub-frames to downlink sub-frames of the virtual cell as 3:7. That is to say, user #A and user #B in the virtual cell perform uplink transmission on the heterogeneous sub-frames (sub-frame 3 and sub-frame 4), and the cooperative cell #1 provides the associated uplink resources for user #A and user #B.

Above mentioned method is also applicable to the scenario where the number of cooperative cells of the virtual cell is larger than two. It should be noted that, in this scenario, when the sub-frame pattern in the uplink-downlink configuration pattern of the virtual cell is a heterogeneous sub-frame pattern, the users in the virtual cell may only utilize the uplink-downlink resources of one of the cooperative cells according to a specified mode. In addition, the users in the virtual cell may also utilize the uplink-downlink resources of multiple cooperative cells, whose uplink-downlink transmission directions are consistent at the time, according to the CoMP transmission mode. Each cooperative cell of the virtual cell may, according to the ratio of uplink traffic requirements to downlink traffic requirements of the virtual cell and the ratio of uplink homogeneous sub-frames to downlink homogeneous sub-frames of the virtual cell, flexibly configure the ratio of uplink heterogeneous sub-frames to downlink heterogeneous sub-frames in the virtual cell, so as to better satisfy the requirement of asymmetric uplink-downlink traffic demands of users in the virtual cell. To avoid redundancy, there are no further descriptions regarding the scenario.

A Third Example

FIG. 10 is a schematic diagram illustrating a method of configuring uplink-downlink resource allocation of the virtual cell according to the resource utilization rate of each cooperation cell of the virtual cell in a third example of the present disclosure.

As shown in FIG. 10, user #A and user #B compose a virtual cell 1010, and both cell #0 and cell #1 are cooperative cells of the virtual cell 1010. Cell #0 and cell #1 respectively adopt uplink-downlink configuration 5 and uplink-downlink configuration 3 to perform uplink-downlink transmission, therefore the uplink-downlink configuration pattern of the virtual cell 1010 is a combination of uplink-downlink configuration 5 and uplink-downlink configuration 3. The allocation of uplink-downlink resources of the virtual cell 1010 are jointly configured by the cooperative base station #0 and the cooperative base station #1 of the virtual cell 1010. That is to say, the users in the virtual cell 1010 may flexibly utilize the uplink-downlink resources of the cooperative cells of the virtual cell 1010.

When the sub-frame pattern in the uplink-downlink configuration pattern of the virtual cell is a homogeneous sub-frame pattern, the users in the virtual cell may utilize the uplink-downlink resources of the serving cell according to a conventional transmission method. In addition, when the sub-frame pattern in the uplink-downlink configuration pattern of the virtual cell is a homogeneous sub-frame pattern, the users in the virtual cell may utilize the uplink-downlink resources of the cooperative cells of the virtual cell in the CoMP transmission mode. From the virtual cell's perspective, for a given homogeneous sub-frame pattern, the uplink-downlink transmission direction of the virtual cell is consistent with the uplink-downlink transmission directions of the cooperative cells of the virtual cell.

When the sub-frame pattern in the uplink-downlink configuration pattern of the virtual cell is a heterogeneous sub-frame pattern, the users in the virtual cell may utilize the uplink-downlink resources of the cooperative cells of the virtual cell according to a specified mode such that the uplink-downlink transmission directions of all users in the virtual cell are consistent with each other for any given time instant. In the example, each cooperative cell of the virtual cell, according to the available uplink and downlink resources and the resource utilization rate of the cooperative cell, allocates preferable uplink and downlink resources to the user terminals in the virtual cell to perform the uplink and downlink transmissions, so that the load balancing between cooperative cells may be achieved.

As shown in FIG. 10, the uplink-downlink resource utilization rate of the cooperative cell #0 is relatively high, and the available uplink-downlink resources of the cooperative cell #0 are limited. Therefore, the cooperative cell #0 is not capable of providing enough uplink-downlink resources for the user terminals in the virtual cell 1010. The uplink-downlink resource utilization rate of the cooperative cell #1 is relatively low, and the available uplink-downlink resources of the cooperative cell #1 are rich. Hence, the cooperative cell #1 is able to provide enough uplink-downlink resources for the user terminals of the virtual cell 1010. In order to achieve the load balancing between cooperative cells, the users in the virtual cell 1010 may utilize more uplink-downlink resources of the cooperative cell #1. In the example, user #A and user #B in the virtual cell 1010 perform uplink transmission on the heterogeneous sub-frames (sub-frame 3 and sub-frame 4), and the cooperative cell #1 provides uplink resources for user #A and user #B. User #A and user #B in the virtual cell 1010 perform uplink and downlink transmissions on the homogeneous sub-frames, and the cooperative cell #0 and cooperative cell #1 provide uplink and downlink resources for user #A and user #B, in which, the cooperative cell #1 provides the majority of the uplink and downlink resources.

Above mentioned method is also applicable to the scenario where more than two cells are employed as the cooperative cells. It should be noted that, in this scenario, when the sub-frame pattern in the uplink-downlink configuration pattern of the virtual cell is a heterogeneous sub-frame pattern, the users in the virtual cell may only utilize the uplink-downlink resources of one of the cooperative cells according to a specified mode. In addition, the users in the virtual cell may also utilize the uplink-downlink resources of multiple cooperative cells, whose uplink-downlink transmission directions are consistent at the time, according to, e.g., CoMP transmission mode. Each cooperative cell of the virtual cell may, according to the allocation of uplink-downlink resources and uplink-downlink resource utilization rate of the cooperative cell, jointly configure preferable uplink-downlink resources for the user terminals in the virtual cell. To avoid redundancy, there are no further descriptions regarding the scenario.

A Fourth Example

FIGS. 11a and 11b are a schematic diagram illustrating a method of configuring uplink-downlink resource allocation of the virtual cell according to the traffic requirement of the virtual cell and the resource utilization rate of each cooperation cell of the virtual cell in a fourth example of the present disclosure.

As shown in FIGS. 11a and 11b, the communications system includes three cells, namely cell #0, cell #1 and cell #2. Cell #0 serves user #A and user #C, cell #1 serves user #B, and cell #2 serves user #D. Cell #0, cell #1 and cell #2 are adjacent to each other. User #A, user #B and user #D compose a virtual cell 1110, and cell #0, cell #1 and cell #2 are cooperative cells of the virtual cell 1110. Cell #0, cell #1 and cell #2 respectively adopt uplink-downlink configuration 5, uplink-downlink configuration 3 and uplink-downlink configuration 1 to perform uplink-downlink transmission, therefore the uplink-downlink configuration pattern of the virtual cell 1110 is a combination of uplink-downlink configuration 5, uplink-downlink configuration 3 and uplink-downlink configuration 1. The allocation of uplink-downlink resources of the virtual cell 1110 are jointly configured by the cooperative base station #0, the cooperative base station #1 and the cooperative base station #2 of the virtual cell 1110. That is to say, the users in the virtual cell 1110 may flexibly utilize the uplink-downlink resources of the cooperative cells of the virtual cell 1110.

When the sub-frame pattern in the uplink-downlink configuration pattern of the virtual cell is a homogeneous sub-frame pattern, the users in the virtual cell may utilize the uplink-downlink resources of the serving cell according to a conventional transmission method. In addition, when the sub-frame pattern in the uplink-downlink configuration pattern of the virtual cell is a homogeneous sub-frame pattern, the users in the virtual cell may utilize the uplink-downlink resources of the cooperative cells according to the CoMP transmission mode. From the virtual cell's perspective, for a given homogeneous sub-frame pattern, the uplink-downlink transmission direction of the user terminals in the virtual cell is consistent with the uplink-downlink transmission direction of the cooperative cells.

When the sub-frame pattern in the uplink-downlink configuration pattern of the virtual cell is a heterogeneous sub-frame pattern, the users in the virtual cell may utilize the uplink-downlink resources of the cooperative cells of the virtual cell according to a specified mode such that the uplink-downlink transmission directions of all users in the virtual cell are consistent with each other for any given time instant. In the example, each cooperative cell of the virtual cell, according to the available uplink-downlink resources and resource utilization rate of the cooperative cell and the total uplink-downlink traffic demands of the virtual cell, allocates preferable uplink and downlink resources for the user terminals in the virtual cell to perform uplink-downlink transmission, so as to satisfy the asymmetric uplink-downlink traffic requirements of users in the virtual cell, and achieve the load balancing among cooperative cells.

In the example, the mobile communications system architecture adopts a centralized processing architecture, such as Centralized Radio Access Network (C-RAN). Each cooperative cell of the virtual cell is connected with a Baseband Unit Pool (BBU Pool) via fiber connections. Each cooperative cell of the virtual cell feeds necessary system configuration information, system statistics information, system state information, and the like back to the BBU Pool. The BBU Pool analyzes and processes the received system configuration information, system statistics information, system state information, and the like, and notifies each cooperative cell of the virtual cell the results of uplink-downlink resource allocation and the associated scheduling strategy, transmission mode selection of the virtual cell. Each cooperative cell of the virtual cell, according to the above mentioned results, allocates preferable uplink-downlink resources for the uplink-downlink transmissions of the users in the virtual cell.

In the example, the system configuration information mainly includes the uplink-downlink configuration of each cooperative cell of the virtual cell.

In the example, the system statistics information mainly includes the resource utilization rate of each cooperative cell of the virtual cell and the total uplink-downlink traffic requirements of the virtual cell.

In the example, the system state information mainly includes the information of network topology, users' distribution, and so on.

As shown in FIGS. 11a and 11b, the uplink-downlink resource utilization rate of the cooperative cell #0 is relatively high, and the available uplink-downlink resources of the cooperative cell #0 are limited; the uplink-downlink resource utilization rate of the cooperative cell #1 is relatively low, and the available uplink-downlink resources of the cooperative cell #1 are rich; the uplink resource utilization rate of the cooperative cell #2 is relatively high, and the available uplink resources of the cooperative cell #2 are limited, the downlink resource utilization rate of the cooperative cell #2 is low, and available downlink resources of the cooperative cell #2 are rich.

As shown in FIGS. 11a and 11b, the downlink resource requirements of user #A in the virtual cell 1110 are twice of the uplink resource requirements of user #A, the uplink resource requirements of user #B in the virtual cell 1110 are twice of the downlink resource requirements of user #B, and the downlink resource requirements of user #D in the virtual cell 1110 are triple of the uplink resource requirements of user #D. The total uplink resource requirements of user #A, user #B and user #D are basically the same as the total downlink resource requirements of user #A, user #B and user #D. Therefore, from the virtual cell's perspective, the downlink resource requirements are more than uplink resource requirements.

When configuring the uplink-downlink resources, scheduling and transmission methods for the virtual cell, the BBU Pool may allocate more downlink sub-frames for the users in the virtual cell, to make the ratio of uplink resources to downlink resources in the uplink-downlink configuration of the virtual cell approach the actual ratio of uplink traffic requirements to downlink traffic requirements, and satisfy the asymmetric uplink-downlink traffic requirement of users in the virtual cell; simultaneously, to make the users in the virtual cell utilize uplink-downlink resources of the cell #1 and downlink resources of cell #2 as many as possible to achieve the load balancing among cooperative cells.

Since the uplink-downlink sub-frames of the virtual cell may be flexibly configured by the cooperative cells of the virtual cell, in order to avoid the collisions of Hybrid Automatic Repeat Request (HARQ) transmissions between the user terminals in the virtual cell and cooperative base stations of the user terminals, it is necessary to re-define the timing of uplink-downlink HARQ processes and/or scheduling of the users in the virtual cell.

In the present disclosure, the timing of HARQ transmission of uplink-downlink data of the users in the virtual cell is determined based on the timing of HARQ transmission of uplink-downlink data of cooperative cells of the virtual cell.

At first, as shown in table 1, the dependencies between uplink-downlink sub-frame sets of the seven uplink-downlink configurations may be determined. For example, the indexes of the downlink sub-frames of the uplink-downlink configuration 0 are 0, 1, 5, 6, and the indexes the downlink sub-frames of the uplink-downlink configuration 6 are 0, 1, 5, 6, 9. Therefore, the downlink sub-frame set of uplink-downlink configuration 0 is a subset of the downlink sub-frame set of uplink-downlink configuration 6. In addition, the indexes of the downlink sub-frames of the uplink-downlink configuration 3 are 0, 1, 5, 6, 7, 8 and 9. Therefore, both the downlink sub-frame set of uplink-downlink configuration 0 and the downlink sub-frame set of uplink-downlink configuration 6 are subsets of the downlink sub-frame set of uplink-downlink configuration 3. Furthermore, the indexes of the downlink sub-frames of the uplink-downlink configuration 1 are 0, 1, 4, 5, 6 and 9. Therefore, both the downlink sub-frame set of uplink-downlink configuration 0 and the downlink sub-frame set of uplink-downlink configuration 6 are subsets of the downlink sub-frame set of uplink-downlink configuration 1. However, there is no dependency between the downlink sub-frame set of uplink-downlink configuration 3 and the downlink sub-frame set of uplink-downlink configuration 1. Similarly, the indexes of the downlink sub-frames of the uplink-downlink configuration 4 are 0, 1, 4, 5, 6, 7, 8 and 9, which suggests that both the downlink sub-frame set of uplink-downlink configuration 1 and the downlink sub-frame set of uplink-downlink configuration 3 are subsets of the downlink sub-frame set of uplink-downlink configuration 4.

In general, for the seven uplink-downlink configurations shown in table 1, the downlink sub-frame set of uplink-downlink configuration 0 is a subset of downlink sub-frame sets of other uplink-downlink configurations; the downlink sub-frame sets of uplink-downlink configurations 0, 1, 2, 3, 4 and 6 are subsets of the downlink sub-frame set of uplink-downlink configuration 5.

The dependencies between uplink sub-frame sets of the uplink-downlink configurations are the opposites of the dependencies between downlink sub-frame sets of the uplink-downlink configurations. That is to say, for the seven uplink-downlink configurations shown in table 1, the uplink sub-frame set of uplink-downlink configuration 5 is a subset of uplink sub-frame sets of other uplink-downlink configurations; the uplink sub-frame sets of uplink-downlink configurations 1, 2, 3, 4, 5 and 6 are subsets of the uplink sub-frame set of uplink-downlink configuration 0.

By determining the dependencies between uplink-downlink sub-frame sets of the uplink-downlink configurations, it can be known that, if the downlink sub-frame set of uplink-downlink configuration X is a subset of the downlink sub-frame set of uplink-downlink configuration Y, the uplink-downlink configuration X may adopt the downlink HARQ ACK/NACK timing relationship of the uplink-downlink configuration Y, and the uplink-downlink configuration Y is called a downlink timing reference configuration of the uplink-downlink configuration X. Meanwhile, the uplink sub-frame set of uplink-downlink configuration Y is a subset of the uplink sub-frame set of uplink-downlink configuration X, the uplink-downlink configuration Y may adopt the uplink HARQ ACK/NACK timing relationship of the uplink-downlink configuration X, and the uplink-downlink configuration X is called an uplink timing reference configuration of the uplink-downlink configuration Y.

In the example, the uplink-downlink configurations of cooperative cell #0, cooperative cell #1 and cooperative cell #2 are respectively uplink-downlink configuration 5, uplink-downlink configuration 3 and uplink-downlink configuration 1. According to the dependencies between uplink-downlink sub-frame sets of the uplink-downlink configurations, the uplink-downlink configuration 5 is a downlink timing reference configuration of the set of cooperative cells, and the uplink-downlink configuration 6 is an uplink timing reference configuration of the set of cooperative cells.

The uplink-downlink sub-frames of the virtual cell are dynamically configured by the set of cooperative cells of the virtual cell. All of the uplink-downlink sub-frame sets of the uplink-downlink configurations of the virtual cell are subsets of the uplink-downlink sub-frame sets of the uplink-downlink timing reference configurations of the set of cooperative cells of the virtual cell. Therefore, the users in the virtual cell may adopt the uplink-downlink HARQ ACK/NACK timing relationship of the uplink-downlink timing reference configuration of the set of cooperative cells, so as to avoid the HARQ resource collision.

FIG. 11c is a schematic diagram illustrating a downlink timing relationship of the virtual cell according to the fourth example of the present disclosure, and FIG. 11d is a schematic diagram illustrating an uplink timing relationship of the virtual cell according to the fourth example of the present disclosure.

As shown in FIG. 11c, the virtual cell in the example adopts the downlink HARQ ACK/NACK timing 1120/1125 of the uplink-downlink configuration 5. As shown in FIG. 11d, the virtual cell in the example adopts the uplink HARQ ACK/NACK timing 1130/1135 of the uplink-downlink configuration 6.

The network side notifies the users of a corresponding uplink-downlink HARQ ACK/NACK timing relationship via Downlink Control Information (DCI).

In addition, it is necessary for the cooperative base stations of the virtual cell to exchange the uplink-downlink HARQ ACK/NACK timing information of users in the virtual cell, so as to better configure uplink-downlink retransmission resources for the users in the virtual cell. The information exchange of the uplink-downlink HARQ ACK/NACK timing may be achieved via the X2 interface between the base stations, or be achieved via a centralized processing method.

Since the uplink-downlink sub-frames of the virtual cell are dynamically configured by cooperative cells of the virtual cell, and the interference directions and/or transmission methods of the cooperative cells in different downlink sub-frames are different, there may be a significant difference between the actual channels on different downlink sub-frames. That is to say, the CSI measured on a downlink sub-frame may be not applicable to other downlink sub-frames due to different interference directions and/or transmission methods of the cooperative cells. For example, the CSI measured by a user terminal in the virtual cell on a homogeneous downlink sub-frame is not applicable to the transmission of the user on a heterogeneous downlink sub-frame. Another example, the CSI measured by a user terminal in the virtual cell on a heterogeneous downlink sub-frame may not be applicable to the transmission of the user on another heterogeneous downlink sub-frame. Therefore, it is necessary to re-define the downlink CSI measurement and feedback strategies of the user terminal in the virtual cell.

At first, the homogeneous downlink sub-frames and heterogeneous downlink sub-frames in the uplink-downlink configuration pattern of the virtual cell are divided into groups.

All of the homogeneous downlink sub-frames in the uplink-downlink configuration pattern of the virtual cell may be grouped into the same downlink sub-frame group, which is called the homogeneous downlink sub-frame group.

For a given heterogeneous downlink sub-frame of the virtual cell, if the current sub-frame direction of one or more cooperative cells differs from that of the virtual cell, that is, the current sub-frame direction of one or more cooperative cells is uplink, multiple transmission direction combinations may be obtained. The heterogeneous downlink sub-frames possessing the same transmission direction combination are grouped into the same downlink sub-frame group, which is called the heterogeneous downlink sub-frame group.

In the example, suppose that the uplink-downlink configurations of the cooperative cell #0, cooperative cell #1 and cooperative cell #2 are respectively uplink-downlink configuration 5, uplink-downlink configuration 3 and uplink-downlink configuration 1, the classification method of the homogeneous downlink sub-frame group and the heterogeneous downlink sub-frame group of the virtual cell is shown in table 4.

TABLE 4

| | Sub-frame index | | | | | | | | | |
|---|---|---|---|---|---|---|---|---|---|---|
| | 0 | 1 | 2 | 3 | 4 | 5 | 6 | 7 | 8 | 9 |
| Virtual cell | D | S | U | D | D | D | S | U | D | D |
| Cell #0 | D | S | U | D | D | D | D | D | D | D |
| Cell #1 | D | S | U | U | U | D | D | D | D | D |
| Cell #2 | D | S | U | U | D | D | S | U | U | D |

Sub-frames 0, 1, 3, 4, 5, 6, 8 and 9 are sub-frames whose transmission directions are downlink or sub-frames including a DwPTS in the virtual cell. Sub-frames 0, 1, 5, 6 and 9 are homogeneous downlink sub-frames, so the sub-frames 0, 1, 5, 6 and 9 are grouped into a homogeneous downlink sub-frame group. Sub-frames 3, 4 and 8 are heterogeneous downlink sub-frames. Corresponding to cell #0, cell #1 and cell #2, the transmission direction combination of sub-frame 3 is (D, U, U), the transmission direction combination of sub-frame 4 is (D, U, D) and the transmission direction combination of sub-frame 8 is (D, D, U). It can be seen that, the transmission direction combinations, corresponding to cell #0, cell #1 and cell #2, of sub-frames 3, 4 and 8 are different from each other. Therefore, sub-frames 3, 4 and 8 are categorized into different heterogeneous downlink sub-frame groups, which are respectively called the first type of heterogeneous downlink sub-frame group, the second type of heterogeneous downlink sub-frame group and the third type of heterogeneous downlink sub-frame group.

For the same type of heterogeneous downlink sub-frame group, because the users in the virtual cell may adopt different transmission modes (single-cell transmission mode or multi-cell cooperative transmission mode), the actual channel conditions may be different. For instance, in the example, user #B in the virtual cell may adopt the single-cell transmission mode in sub-frame 8 (the third type of heterogeneous downlink sub-frame group) of the radio frame X, and only utilizes the downlink resources of cell #0. User #B in the virtual cell may adopt the multi-cell cooperative transmission mode in sub-frame 8 of the radio frame Y (Y≠X), and utilizes both the downlink resources of cell #0 and cell #1. Since user #B adopts different transmission modes in the same type of heterogeneous downlink sub-frame group of the radio frame X and the radio frame Y, the channel conditions experienced by user #B in the same type of heterogeneous downlink sub-frame group of the radio frame X and the radio frame Y are different, it is therefore necessary to configure different CSI measurement and feedback mechanisms. In conclusion, it is necessary to further differentiate the same type of heterogeneous downlink sub-frame groups according to different transmission mode combinations. For instance, in the example, for the third type of heterogeneous downlink sub-frame groups, the transmission mode combinations adopted by the users in the virtual cell may include single cell #0 transmission, single cell #1 transmission, and cell #0 and cell #2 cooperative transmission, which may be respectively classified as the third type of heterogeneous downlink sub-frame group with transmission modes #0, #1 and #2.

It should be noted that, the example of the present disclosure is not limited to above mentioned classification method, other methods capable of classifying the downlink sub-frame groups according to the interference condition, scheduling and transmission methods of downlink sub-frames may be applicable to the present disclosure.

In the present disclosure, the downlink CSI measurement and feedback may be performed in an aperiodic manner.

Specifically, the network side may inform the user terminals in the virtual cell of the information of sub-frame grouping and numbering via a signaling. For example, the network side informs, via a high layer signaling, the user terminals in the virtual cell of the type of each downlink sub-frame group, the number of each of the same type of heterogeneous downlink sub-frame groups, and the time-scale of the CSI measurement and feedback of the same type of heterogeneous downlink sub-frame groups with the same number.

In addition, the network side may trigger a user in the virtual cell to feed back a downlink CSI of at least one downlink sub-frame group. That is, after receiving the triggering information of the network side, the user terminal in the virtual cell feeds back a corresponding measurement result.

Preferably, the network side may trigger, via Channel Quality Indicator (CQI) request information in the UL grant, the user terminal in the virtual cell to feed back the downlink CSI of at least one downlink sub-frame group on corresponding Physical Uplink Shared Channel (PUSCH) resources. Correspondingly, the user terminal in the virtual cell may, according to the received CQI request information in the UL grant, feed back the measurement result after it is allowed to do so.

In addition, it is necessary for the cooperative base stations of the virtual cell to exchange the downlink CSIs fed back by the users in the virtual cell, so as to better configure uplink-downlink resources for the users in the virtual cell. The information exchange of downlink CSIs may be achieved via the X2 interface between the base stations, or be achieved via a centralized processing method.

A Fifth Example

FIG. 12a is a schematic diagram illustrating the vertical sectorization in an active antenna system according to a fifth example of the present disclosure;

Referring to FIG. 12a, the system may be an Active Antenna System (AAS) 1210, and may configure the allocation of uplink-downlink resources, methods of scheduling and transmission for the users in the virtual cell via space division multiplexing. The AAS refers to an active antenna array in which each radiating element is integrated with a corresponding RF/digital circuit module and each antenna may be independently controlled via a digital interface. The vertical dimension port in the AAS has a significant impact on the design of base station and antenna array, the spectrum efficiency, the network architecture, the operating and maintaining cost, and so on. Furthermore, with the further development of the AAS technology, the AAS-enabled 3-Dimensional Multiple-Input Multiple-Output (3D-MIMO) and massive MIMO technologies also become key technologies of the 5G communications system.

FIG. 12b is a schematic diagram illustrating the separation of uplink-downlink transmission in the active antenna system according to the fifth example of the present disclosure.

As shown in FIG. 12b, by utilizing the flexibility of vertical dimension adjustment of the AAS array 1220, the independent optimizations of uplink and downlink may be achieved, inter-cell interference may be avoided, and the adaptability of the system to the asymmetric uplink-downlink traffic demands may be enhanced.

FIG. 12c is a schematic diagram illustrating a method of configuring uplink-downlink resource allocation of the virtual cell in the active antenna system according to the fifth example of the present disclosure.

As shown in FIG. 12c, user #A and user #B compose a virtual cell 1230, and both cell #0 and cell #1 are cooperative cells of the virtual cell 1230. Cell #0 and cell #1 respectively adopt uplink-downlink configuration 5 and uplink-downlink configuration 3 to perform uplink-downlink transmission. Base station #0 and base station #1 respectively adopt an AAS. The active antenna array may be divided into $AAS_x^r$ and $AAS_x^v$ in vertical dimension, in which, x is a cell index, and in the example, the x respectively is #0 and #1. By adjusting and optimizing the antenna down-tilting angles, $AAS_x^v$ is configured as an antenna array serving the users in the virtual cell 1230, $AAS_x^r$ is configured as an antenna array serving the cell-center users in the cell. In the example, $AAS_0^v$ and $AAS_1^v$ are antenna arrays serving the users in the virtual cell 1230, the antenna arrays may adopt single-point transmission mode, or multi-point cooperative transmission mode. By utilizing the flexibility of vertical dimension adjustment of the AAS array and antenna selection technology, the virtual cell 1230 may configure one uplink-downlink configuration that is different from that of the cooperative cells of the virtual cell 1230. In the example, the virtual cell 1230 may employ the uplink-downlink configuration 2 to perform uplink-downlink transmission.

In the example, at the time instant corresponding to sub-frame 7, both the sub-frame of cell #0 and the sub-frame of cell #1 are downlink sub-frames, but the sub-frame of the virtual cell 1230 is an uplink sub-frame. User #C in cell #0 receives downlink data transmitted by antenna array $AAS_0^r$, and user #D in cell #1 receives downlink data transmitted by antenna array $AAS_1^r$. Uplink data of user #A and user #B in the virtual cell 1230 is respectively received through antenna array $AAS_0^v$ of base station #0 and antenna array $AAS_1^v$ of base station #1. In addition, Uplink data of user #A and user #B may also be received by antenna array $AAS_0^v$ of base station #0 and antenna array $AAS_1^v$ of base station #1 in a multi-point cooperative reception mode.

Since the user terminals in the virtual cell 1230 adopt the same uplink-downlink configuration, there is no cross-slot interference among user terminals in the virtual cell 1230. Because the geographical distance between the cell-center users of adjacent cells (such as user #C and user #D in the example) is relatively large, the beam-forming technology may be used to avoid the cross-slot interference. Besides, due to the fact that the base station equipped with AAS is fully aware of the configuration information including the power and angle of departure (AoD) of downlink transmitting signals of the base station on $AAS_x^v$ and/or $AAS_x^r$, the cross-slot interference between the users in the virtual cell 1230 (such as user #A and user #B in the example) and the cell-center users in the cooperative cells (such as user #C and user #D) may be eliminated by using beam-forming, power and antenna down-tilting optimization, selective scheduling, self-interference-cancellation, and a combination thereof. In addition, in this case, the time-scale of dynamic uplink-downlink configuration, downlink CSI measurement and feedback, uplink-downlink HARQ ACK/NACK timing, and the like of users in the virtual cell 1230 and cell-center users in the cooperative cells may be independently configured. The configuration information may be obtained through higher layer signaling or physical layer signaling.

A Sixth Example

In the example, the uplink-downlink transmission of the system employs the HDD mode.

FIG. 13a is a schematic diagram illustrating the frame structure in a preferable HDD communications system according to the sixth example of the present disclosure.

Referring to FIG. 13a, The HDD communications system adopts the frame structure parameters of the LTE, including subcarrier spacing, Cyclic Prefix (CP), length of a radio frame and length of a sub-frame. Therefore, for a normal CP, one sub-frame includes 14 symbols each with the length of 66.7 μs. In addition, one sub-frame is divided into two slots with each slot comprising 7 symbols. In each slot, the length of the first CP symbol is 5.21 μs; the length of any of other 6 CP symbols is 4.69 μs. For an extended CP, one sub-frame includes 12 symbols, and the length of the CP of each of the 12 symbols is 16.67 μs.

As shown in FIG. 13a, the HDD communications system includes pairs of carriers. The radio frame structure of a master carrier 1310 includes special sub-frames and each special sub-frame includes a DwPTS, a GP and an UpPTS. The Primary Synchronization signal (PSS), Secondary Synchronization Signal (SSS) and Physical Broadcasting channel (PBCH) of the master carrier 1310 may be used by the user terminal to perform cell search, and are transmitted in the DwPTS in the special sub-frame. Furthermore, just like the LTE system, the master carrier 1310 further includes a Dynamic Broadcasting channel (DBCH), which is scheduled and indicated by a Physical Downlink Control Channel (PDCCH). The DBCH carries necessary broadcasting information, including System Information Blocks (SIBs) except the Master Information Blocks (MIBs) on the PBCH.

The HDD wireless communications base station performs downlink transmission in downlink sub-frames and DwPTSs on the master carrier 1310, and receives a Sounding Reference Symbol (SRS) in an UpPTS of a special sub-frame on the master carrier 1310 to obtain the channel reciprocity, so as to reduce the feedback overhead required by multi-antenna transmission (such as the beam-forming).

The user terminal supporting HDD mode may perform cell search in the master carrier 1310 to obtain downlink synchronization information and cell identification, and then decode the broadcast information on the master carrier 1310.

The broadcast information transmitted by the HDD wireless communications base station includes configuration information of special sub-frames, frequency location and bandwidth information of the slave carrier 1320, and configuration information of radio frame structure of the slave carrier 1320.

The user terminal communicates with the base station on the master carrier 1310 and the slave carrier 1320 according to a pre-defined manner. Specifically, when all sub-frames on the slave carrier 1320 are uplink sub-frames, the user terminal may communicate with the base station on the master carrier 1310 and the slave carrier 1320 according to the FDD mode; when the slave carrier 1320 is used for uplink and downlink transmission in time division multiplexing mode, the user terminal may communicate with the base station on downlink resources of the master carrier 1310 and uplink resources of the slave carrier 1320 according to the FDD mode, and/or, the user terminal may communicate with the base station on downlink resources of the slave carrier 1320 and uplink resources of the slave carrier 1320 according to the TDD mode.

FIG. 13*b* is a schematic diagram illustrating a method of configuring uplink-downlink resource allocation of the virtual cell in the preferable hybrid division duplex communications system according to the sixth example of the present disclosure.

As shown in FIG. 13*b*, user #A, user #B and user #D compose a virtual cell 1330, and cell #0 and cell #1 are cooperative cells of the virtual cell 1330. The base station and the user terminal adopt the HDD communications mode. The frame structure of the master carrier 1310 of cell #0 and cell #1 is shown in FIG. 13*a*. Cell #0 and cell #1 respectively adopt the TDD frame structure of uplink-downlink configuration 5 and uplink-downlink configuration 3 on the slave carrier 1320. The master carrier 1310 frame structure of the virtual cell 1330 is the same as that of cell #0 and cell #1. The uplink-downlink configuration pattern of the virtual cell 1330 on the slave carrier 1320 is a combination of uplink-downlink configuration 5 and uplink-downlink configuration 3. The allocation of uplink-downlink resources of the virtual cell 1330 are jointly configured on the master carrier 1310 and the slave carrier 1320 by the cooperative base station #0 and cooperative base station #1. That is, the users in the virtual cell 1330 may flexibly utilize the uplink-downlink resources of the cooperative cells of the virtual cell 1330.

When the sub-frame pattern in the uplink-downlink configuration pattern of the virtual cell 1330 on the slave carrier 1320 is a heterogeneous sub-frame pattern, the users in the virtual cell 1330 may utilize the uplink-downlink resources of the master carrier 1310 and the slave carrier 1320 of the cooperative cells of the virtual cell 1330 according to a specified mode. A cooperative base station of the virtual cell 1330 may, according to the average interference level between the users in the virtual cell 1330, location information of the user terminals, the BSRs of the user terminals, load information of each cooperative cell, and the like, jointly configure the allocation of uplink-downlink resources of the master carrier 1310 and the slave carrier 1320 for the users in the virtual cell 1330, to perform uplink-downlink transmission.

FIG. 13*c* is a schematic diagram illustrating a method of configuring uplink-downlink resource allocation of the virtual cell in the preferable hybrid division duplex communications system according to the sixth example of the present disclosure.

As shown in FIG. 13*c*, the downlink resource requirements of user #A and user #D in the virtual cell 1340 are relatively high, the cooperative base station #0 and cooperative base station #1 of the virtual cell 1340 provide downlink resources on the master carrier for user #A and user #D in the virtual cell 1340 on the 4th sub-frame. The cooperative base station #0 and cooperative base station #1 transmit downlink data required by user #A in CoMP mode, base station #0 transmits downlink data required by user #D in single-cell transmission mode. The uplink resource requirements of user #B and user #D in the virtual cell 1340 are relatively high, the cooperative base station #1 of the virtual cell 1340 provides uplink resources on the slave carrier for user #B and user #D in the virtual cell 1340 on the 4th sub-frame. Obviously, since the uplink-downlink transmission of the users in the virtual cell 1340 is performed on different carrier frequencies, there is no cross-slot interference between user terminals in the virtual cell 1340.

Similarly, in the HDD system, there are other methods for flexibly configuring uplink-downlink resource allocations of the master carrier and slave carrier for the virtual cell. For instance, all cooperative cells of the virtual cell jointly configure the allocation of uplink-downlink resources for the users in the virtual cell according to the load on the master carrier and the slave carrier. To avoid redundancy, there are no further descriptions regarding the scenario.

If each cooperative cell of the virtual cell is unable to allocate the resources on the master carrier for the users in the virtual cell, the method for allocating uplink-downlink resources of the slave carrier for the virtual cell may be performed according to the methods depicted in the first, second, third, fourth and fifth examples.

Corresponding to above mentioned method, the present disclosure also provides an apparatus of a base station, which will be described with reference to an accompanying drawing.

FIG. 14 is a schematic diagram illustrating a base station according to an example of the present disclosure. As shown in FIG. 14, a control module of the base station includes a user classification module 1410, a virtual cell establishment module 1420 and a resource management module 1420.

The user classification module 1410 is configured to determine a cell-edge user according to measurement information obtained from a user terminal.

The virtual cell establishment module 1420 is configured to perform information exchange with an adjacent base station, and establish a virtual cell including the cell-edge user.

The resource management module 1430 is configured to perform information exchange with a base station which serves user terminals in the virtual cell, and configure allocation of uplink-downlink resources and a transmission mode for the virtual cell.

Preferably, the base station shown in FIG. 14 may further include a configuration module (not shown). The configuration module is configured to configure the transmission direction of each frame of the virtual cell; In a HDD system, configure the transmission direction of each frame on the slave carrier of the virtual cell; configure the scheduling strategy of the users in the virtual cell; configure the uplink-downlink HARQ ACK/NACK timing of the users in the virtual cell; configure the downlink CSI measurement and feedback mechanism of the users in the virtual cell; configure an antenna array serving the users in the virtual cell.

Preferably, the base station shown in FIG. 14 may further include a receiving module (not shown). The receiving module is configured to receive the RSRP/RSRQ and an uplink SRS transmitted by a user terminal, and receive buffer status information and location information transmitted by the user terminal; provide received information to other modules.

Preferably, the user classification module 1410 is further configured to group and number the homogeneous downlink sub-frames and heterogeneous downlink sub-frames of the virtual cell according to the uplink-downlink configuration pattern of the virtual cell.

Preferably, the base station shown in FIG. 14 may further include a communications module (not shown). The communications module is configured to communicate with the user terminal on the uplink-downlink resources of each sub-frame; in a HDD system, when all sub-frames on the slave carrier are uplink sub-frames, communicate with the user terminal on the master carrier and the slave carrier according to the FDD mode; when the slave carrier is used for uplink and downlink transmission in time division multiplexing mode, communicate with the user terminal on downlink resources of the master carrier and uplink resources of the slave carrier according to the FDD mode, and/or, communicate with the user terminal on downlink resources of the slave carrier and uplink resources of the slave carrier according to the TDD mode; communicate with other base stations, receive and transmit system configuration information including uplink-downlink configuration information, terminal information, and so on; receive and transmit system statistics information including uplink-downlink traffic information of a user terminal, load information of a base station, and the like; receive and transmit system state information including uplink-downlink HARQ ACK/NACK timing relationship, and so on; receive and transmit a switch request and a response of a user in the virtual cell; receive and transmit control information of a user in the virtual cell; receive and transmit the downlink CSI measurement information of a user in the virtual cell.

The foregoing description is only preferred embodiments of the present disclosure and is not used for limiting the protection scope thereof. Any modification, equivalent substitution, or improvement made without departing from the spirit and principle of the present disclosure should be covered by the protection scope of the present disclosure.

The invention claimed is:

1. A resource management method, comprising:
receiving, by a base station, measurement information from at least one user terminal in a cell to determine a first cell edge in the cell;
transmitting, by the base station, information of a first cell edge user in the cell to an adjacent base station, and receiving, from the adjacent base station, information of a second cell edge user in an adjacent cell;
establishing, by the base station, a virtual cell comprising the first cell edge user in the cell and the second cell edge user in the adjacent cell according to the information of the first cell edge user in the cell and the information of the second cell edge user in the adjacent cell;
transmitting, by the base station, configuration information of the first cell edge user in the cell and configuration information of the cell to base stations, each of which having cell edge users in the virtual cell located therein;
receiving, from the base stations, each of which having the cell edge users in the virtual cell located therein, configuration information of each of third cell edge users and configuration information of each of a number of cells where the each of the third cell edge users is located; and
configuring, by the base station, uplink-downlink resource allocation and a transmission mode for the cell edge users in the virtual cell based on the configuration information of each of the third cell edge users and the configuration information of each of cells where each of the third cell edge users is located.

2. The method according to claim 1, wherein the first cell edge user in the cell is determined by classifying the at least one user terminal in the cell as a cell-center user or a fourth cell edge user according to the measurement information, a predefined threshold and a predefined principle.

3. The method according to claim 1, further comprising:
configuring, by the base station, a set of candidate cooperative base stations for respective user terminal in the cell, wherein an initial set of the candidate cooperative base stations is an empty set;
for each user terminal, adding, by the base station, the base station and a base station of the adjacent cell into the set of the candidate cooperative base stations of the user terminal, based on a relationship between the measurement information of the cell, measurement information of the adjacent cell measured by the user terminal and a predefined threshold; and
identifying, by the base station, a user terminal of which the set of candidate cooperative base stations is the empty set as a cell-center user, and identifying a user terminal of which the set of candidate cooperative base stations is not the empty set as a fourth cell edge user.

4. The method according to claim 3, wherein the information of the first cell edge user in the cell transmitted to the adjacent base station in the set of candidate cooperative base stations, comprises information of the set of candidate cooperative base stations corresponding to the first cell edge user, and
wherein the information of the second cell edge user in the adjacent cell received from the adjacent base station in the set of candidate cooperative base stations comprises information of the set of candidate cooperative base stations corresponding to each of cell edge users.

5. The method according to claim 4, wherein the establishing, by the base station, the virtual cell comprising the cell edge users comprises:
grouping, by the base station, cell edge users, with which the set of candidate cooperative base stations matches into the virtual cell, and
wherein the set of candidate cooperative base stations becomes a set of cooperative base stations of the virtual cell, and a cell corresponding to a cooperative base station in the set of cooperative base stations becomes a cooperative cell.

6. The method according to claim 5, further comprising:
obtaining, by the base station, configuring an uplink-downlink HARQ timing relationship to be adopted by the user terminals in the virtual cell, the configuration information of the each of cells where the each of the third cell edge users is located comprising uplink-downlink timing reference configuration of the set of cooperative cells; and determining the uplink-downlink HARQ timing relationship to be adopted by the user terminals in the virtual cell based on a uplink-downlink HARQ timing relationship of the uplink-downlink timing reference configuration.

7. The method according to claim 4, wherein at least one of the information of the first cell edge user and the information of the set of the candidate cooperative base stations comprises: at least one of user-specific channel state information (CSI), user-specific buffer status report (BSR), cell-specific load information, cell-specific uplink-downlink configuration information, or a combination thereof.

8. The method according to claim 1, wherein configuring, by the base station, the uplink-downlink resource allocation and the transmission mode for the cell edge users in the virtual cell comprises:

configuring, by the base station, uplink-downlink resources of which transmission directions at a same transmission time are same for user terminals in a same virtual cell, and wherein the transmission mode includes one of single-cell transmission and multi-cell cooperative transmission.

9. The method according to claim 8, wherein configuring, by the base station, the uplink-downlink resources of which the transmission directions at the same transmission time are same for the user terminals in the same virtual cell comprises:

according to uplink-downlink configuration information of each cooperative base station, on sub-frames of which the transmission directions are same, configuring, by the base station, the uplink-downlink resources for each of the user terminals according to a configuration of a serving cell of each of the user terminals; or according to uplink-downlink configuration information of each cooperative base station, on sub-frames of which the transmission directions are not same, configuring, by the base station, uplink-downlink resources of which transmission directions are the same for each of the user terminals.

10. The method according to claim 9, wherein, on the sub-frames of which the transmission directions are not same, configuring, by the base station, the uplink-downlink resources of which the transmission directions are same for each of the user terminals comprises:

on the sub-frames of which the transmission directions are same, configuring, by the base station, the uplink-downlink resources of which the transmission directions are the same for each of the user terminals according to a system performance indicator, and wherein the system performance indicator comprises one or more of a uplink-downlink average throughput and/or spectrum efficiency of each user terminal in the virtual cell, a uplink-downlink average throughput and/or spectrum efficiency of user terminals of the base station and the adjacent base station, a total uplink-downlink resource requirement of user terminals in the virtual cell and/or uplink-downlink resource utilization rate of each cooperative cell of the virtual cell.

11. A base station, comprising: a control module and a communication module; wherein, the control module is configured to:

determine a first cell edge user in a cell according to measurement information obtained from at least one user terminal in the cell;

transmit information of the first cell edge user in the cell to an adjacent base station, and receive, from the adjacent base station, information of a second cell edge user in an adjacent cell, establish a virtual cell comprising the first cell edge user in the cell and the second cell edge user in the adjacent cell according to the information of the first cell edge user in the cell and the information of the second cell edge user in the adjacent cell;

transmit configuration information of the first cell edge user in the cell and configuration information of the cell to base stations, each of which having cell edge users in the virtual cell located therein, and receive, from the base stations, each of which having the cell edge users in the virtual cell located therein, configuration information of each of third cell edge users and configuration information of each of cells where the each of the third cell edge users is located; and configure uplink-downlink resource allocation and a transmission mode for the cell edge users in the virtual cell based on the configuration information of each of the third cell edge users and the configuration information of each of a number of cells where each of the third cell edge users is located.

12. The base station according to claim 11, wherein the first cell edge user in the cell is determined by classifying the at least one user terminal in the cell as a cell-center user or a fourth cell edge user according to the measurement information, a predefined threshold and a predefined principle.

13. The base station according to claim 11, wherein the control module is further configured to:

configure a set of candidate cooperative base stations for respective user terminal in the cell, wherein an initial set of the candidate cooperative base stations is an empty set;

for each user terminal, add the base station and a base station of the adjacent cell into the set of the candidate cooperative base stations of the user terminal, based on a relationship between the measurement information of the cell, measurement information of the adjacent cell measured by the user terminal and a predefined threshold; and identify a user terminal of which the set of candidate cooperative base stations is the empty set as a cell-center user, and identify a user terminal of which the set of candidate cooperative base stations is not the empty set as a fourth cell edge user.

14. The base station according to claim 13, wherein the information of the first cell edge user in the cell transmitted to the adjacent base station in the set of candidate cooperative base stations, comprises information of the set of candidate cooperative base stations corresponding to the first cell edge user, and the information of the second cell edge user in the adjacent cell received from the adjacent base station in the set of candidate cooperative base stations comprises information of the set of candidate cooperative base stations corresponding to each of cell edge users.

15. The base station according to claim 14, wherein the control module is further configured to:

group cell edge users, with which the set of candidate cooperative base stations matches into the virtual cell, wherein the set of candidate cooperative base stations becomes a set of cooperative base stations of the virtual cell, and a cell corresponding to a cooperative base station in the set of cooperative base stations becomes a cooperative cell.

16. The base station according to claim 15, wherein the control module is further configured to:
  obtain configuring an uplink-downlink HARQ timing relationship to be adopted by the user terminals in the virtual cell, the configuration information of the each of cells where the each of the third cell edge users is located comprising uplink-downlink timing reference configuration of the set of cooperative cells; and
  determine the uplink-downlink HARQ timing relationship to be adopted by the user terminals in the virtual cell based on a uplink-downlink HARQ timing relationship of the uplink-downlink timing reference configuration.

17. The base station according to claim 14, wherein at least one of the information of the first cell edge user and the information of the set of the candidate cooperative base stations comprises: at least one of user-specific channel state information (CSI), user-specific buffer status report (BSR), cell-specific load information, cell-specific uplink-downlink configuration information, or a combination thereof.

18. The base station according to claim 11, wherein the control module is further configured to:
  configure uplink-downlink resources of which transmission directions at the same transmission time are same for user terminals in a same virtual cell, and
  wherein the transmission mode includes one of single-cell transmission and multi-cell cooperative transmission.

19. The base station according to claim 18, wherein the control module is further configured to:
  according to uplink-downlink configuration information of each cooperative base station, on sub-frames of which the transmission directions match, configure the uplink-downlink resources for each of the user terminals according to a configuration of a serving cell of each of the user terminals; or
  according to uplink-downlink configuration information of each cooperative base station, on sub-frames of which the transmission directions are not same, configure uplink-downlink resources of which transmission directions are the same for each of the user terminals.

20. The base station according to claim 19, wherein the control module is further configured to:
  on the sub-frames of which the transmission directions are not same, configure the uplink-downlink resources of which the transmission directions are same for each of the user terminals according to a system performance indicator, and
  wherein the system performance indicator comprises one or more of a uplink-downlink average throughput and/or spectrum efficiency of each user terminal in the virtual cell, a uplink-downlink average throughput and/or spectrum efficiency of user terminals of the base station and the adjacent base station, a total uplink-downlink resource requirement of user terminals in the virtual cell and/or uplink-downlink resource utilization rate of each cooperative cell of the virtual cell.

* * * * *